(12) United States Patent
Nakai et al.

(10) Patent No.: US 7,236,302 B2
(45) Date of Patent: Jun. 26, 2007

(54) DIFFRACTION OPTICAL ELEMENT

(75) Inventors: Takehiko Nakai, Tochigi (JP); Hideo Ukuda, Kanagawa (JP); Masaaki Nakabayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 274 days.

(21) Appl. No.: 11/116,083

(22) Filed: Apr. 27, 2005

(65) Prior Publication Data

US 2005/0243423 A1 Nov. 3, 2005

(30) Foreign Application Priority Data

Apr. 28, 2004 (JP) ............... 2004-134575
Apr. 19, 2005 (JP) ............... 2005-121169

(51) Int. Cl.
*G02B 5/18* (2006.01)

(52) U.S. Cl. ............... 359/571; 359/566; 359/569; 359/575; 359/576

(58) Field of Classification Search ........... 359/565, 359/566, 569–571, 575, 576
See application file for complete search history.

(56) References Cited

U.S. PATENT DOCUMENTS

| 5,044,706 | A | 9/1991 | Chen |
| 5,790,321 | A | 8/1998 | Goto |
| 6,157,488 | A | 12/2000 | Ishii |
| 6,480,332 | B1 | 11/2002 | Nakai |
| 6,560,019 | B2 | 5/2003 | Nakai |
| 2003/0231396 | A1* | 12/2003 | Nakai ............... 359/569 |
| 2004/0042102 | A1* | 3/2004 | Ukuda ............... 359/883 |

FOREIGN PATENT DOCUMENTS

| EP | 0 895 099 A2 | 2/1999 |
| EP | 1 342 557 A1 | 9/2003 |
| EP | 1 376 161 A2 | 1/2004 |
| JP | 04-213421 | 8/1992 |
| JP | 06-324262 | 11/1994 |
| JP | 9127322 | 5/1997 |
| JP | 2000-98118 | 4/2000 |
| JP | 3495884 | 11/2003 |
| JP | 2004-078166 | 3/2004 |

OTHER PUBLICATIONS

SPIE vol. 1354 International Lens Design Conference, Jun. 11-14, 1990.

* cited by examiner

*Primary Examiner*—Leonidas Boutsikaris
(74) *Attorney, Agent, or Firm*—Morgan & Finnegan LLP

(57) ABSTRACT

In a diffraction optical element in which a plurality of diffraction gratings are laminated and the maximum difference of length among optical paths of light passing through the plurality of diffraction gratins is integer multiples of a plurality of wavelengths, diffraction efficiency is further improved and even when an environmental condition changes, a deviation of the diffraction efficiency is reduced. More specifically, a diffraction optical element is disclosed which includes, as the plurality of diffraction gratings, a first diffraction grating made of a resin material, in which inorganic fine particles are dispersed, and a second diffraction grating made of a material whose organic matter composition is substantially same as that of the resin material.

21 Claims, 15 Drawing Sheets

ULTRAVIOLET RAYS

DIFFRACTION OPTICAL ELEMENT

BACKGROUND OF THE INVENTION

1. Field of the Invention

The present invention relates to a diffraction optical element and an optical system having the diffraction optical element.

2. Related Background Art

Conventionally, aside from a method with which chromatic aberrations of a lens system are reduced through combination of glass materials, a method is known with which such chromatic aberrations of a lens system are reduced by providing a diffraction optical element having a diffraction function for a part of a lens surface or a lens system (SPIE Vol. 1354 International Lens Design Conference (1990), Japanese Patent Application Laid-Open No. H04-213421 (corresponding to U.S. Pat. No. 5,044,706), Japanese Patent Application Laid-Open No. H06-324262 (corresponding to U.S. Pat. No. 5,790,321), and U.S. Pat. No. 5,044,706). The method using a diffraction optical element is a method utilizing a physical phenomenon where the appearing direction of chromatic aberrations with respect to a light beam at a certain reference wavelength at a refractive surface and the appearing direction thereof at a diffraction surface become opposite to each other in an optical system.

Also, it is possible to give an aspherical lens effect to the diffraction optical element by appropriately changing the period of the periodic structure thereof, so the diffraction optical element is also effective at reducing various aberrations other than chromatic aberrations.

In a lens system having a diffraction optical element, when light fluxes in a usage wavelength range are concentrated on diffraction light on a specific order (hereinafter also referred to as "specific order" or "design order"), the intensity of diffraction light on the other orders is reduced and when the intensity becomes "0," this results in a situation where the diffraction light does not exist. In reality, however, unnecessary diffraction light on such orders other than the design order exists and when the unnecessary diffraction light has certain intensity, it travels in an optical system through different path from that of a light beam on the design order and becomes flare light.

Consequently, in order to utilize an aberration reduction function by utilizing a diffraction optical element, it is necessary that the diffraction efficiency as to diffraction light on the design order be sufficiently high in the entire usage wavelength range. It is important that consideration is sufficiently given to the spectral distribution of the diffraction efficiency on the design order and the behavior of the unnecessary diffraction light on the orders other than the design order.

Therefore, various diffraction optical elements are proposed which each have a construction where diffraction efficiency is improved and unnecessary diffraction light is reduced (Japanese Patent Application Laid-Open No. H09-127322 (corresponding to U.S. Pat. No. 6,157,488), Japanese Patent Application Laid-Open No. 2000-098118 (corresponding to U.S. Pat. No. 6,560,019), Japanese Patent No. 03495884 (corresponding to U.S. Pat. No. 6,480,332). Diffraction optical elements disclosed in Japanese Patent Application Laid-Open No. H09-127322, Japanese Patent Application Laid-Open No. 2000-098118, and Japanese Patent No. 03495884 realize high diffraction efficiency in a wide wavelength band (around 98% in a wavelength range of 450 nm to 650 nm) for diffraction light on a desired order by lamination-arranging multiple diffraction gratings and appropriately setting the material of each diffraction grating and the height of each diffraction grating (such a diffraction optical element will be hereinafter referred to as "laminated DOE"). Note that the diffraction efficiency is expressed by a ratio of the light amount of diffraction light on each order to the total amount of all transmission light beam.

In Japanese Patent No. 03495884, a construction is disclosed with which changes in diffraction efficiency resulting from changes in the refractive index of a material of a diffraction grating due to temperature changes are reduced. More specifically, through optimum settings of refractive index changes due to temperature changes of two materials forming respective diffraction gratings and the grating heights of two diffraction gratings, diffraction efficiency changes are suppressed in a range of a temperature change of 30° C. With this construction, from the viewpoint of not only improvement of diffraction efficiency in terms of design but also stabilization of performance under a usage environment, optimization of the materials forming the diffraction gratings and the shapes of the diffraction gratings is performed.

Recently, a diffraction optical element whose diffraction efficiency is further improved is proposed (Japanese Patent Application Laid-Open No. 2004-78166 (corresponding to U.S. 2003-0231396)). Japanese Patent Application Laid-Open No. 2004-78166 discloses a diffraction optical element in which a fine particle dispersed resin is adopted as a material of a diffraction grating in which inorganic fine particles are mixed into a resin material while giving consideration to the partial dispersion ratio θgF of the material. With this construction, as indicated by a curve 1 shown in FIG. 14, high diffraction efficiency of 99.8% or more is obtained in the entire usage wavelength range.

In addition, with the diffraction optical element disclosed in Japanese Patent Application Laid-Open No. 2004-78166, as indicated by a curve 1 shown in each of FIGS. 20A, 20B, 21A, and 21B, the diffraction efficiency of diffraction light on orders of "design order±1" that are unnecessary diffraction orders (zero-order diffraction light and +2nd-order diffraction light) is favorably suppressed to 0.05% or less in the entire usage wavelength range. As a result, the diffraction optical element disclosed in Japanese Patent Application Laid-Open No. 2004-78166 reduces the unnecessary diffraction light to around 1/10 in comparison with a diffraction optical element using a conventional material.

With the diffraction optical element disclosed in Japanese Patent Application Laid-Open No. 2004-78166, the diffraction efficiency is significantly improved, but it is further preferable that deviations of the diffraction efficiency due to usage environments be suppressed.

With the diffraction optical element disclosed in Japanese Patent No. 03495884, change in diffraction efficiency on the design order due to 30° C. change in temperature is suppressed to around 2%. Changes by 2% in the diffraction efficiency on the design order means that the diffraction efficiency of 99.8% which has been improved by the diffraction optical element disclosed in Japanese Patent Application Laid-Open No. 2004-78166 is degraded to around 98% due to temperature changes. The diffraction efficiency of the diffraction optical element before the improvement using the technique disclosed in Japanese Patent Application Laid-Open No. 2004-78166 is around 98% in a wavelength range of 450 nm to 650 nm, therefore, the diffraction efficiency improved through the technique disclosed in Japanese Patent Application Laid-Open No. 2004-78166 might be nullified.

Curve 2 shown in each of FIGS. 14 to 16 represents the diffraction efficiency in the case where the refractive index of the material changes due to temperature change of 30° C. As is apparent from FIGS. 14 to 16, the diffraction efficiency of diffraction light on the +1st-order that is the design order is decreased by around 0.5 to 2.0% and the diffraction efficiency of the zero-order diffraction light and the 2nd-order diffraction light that are unnecessary diffraction light are conversely increased by around 0.2 to 0.7%.

It should be noted here that the above description has been made by taking, as an example, a change in the diffraction efficiency due to temperature deviation, but it is also possible to consider a situation where the optical characteristic of a material forming a diffraction grating changes due to moisture absorption. That is, it is important that consideration is given to change in the diffraction efficiency resulting from environmental deviations including a moisture deviation and the like.

In reality, the degree of the change in the diffraction efficiency resulting from the environmental deviations changes in behavior to some extent in accordance with the initial diffraction efficiency and the combination of grating shapes. However, the change in the diffraction efficiency due to the environmental deviations fundamentally depends on the characteristic of the material, so it becomes important to improve the environmental tolerance characteristic of the material.

When it is possible to suppress the deviation of the curve 2 shown in FIG. 14 to a deviation of around 0.2%, even when environmental changes exist, it is possible to say that the diffraction efficiency is sufficiently high. The environmental tolerance characteristic of the material can be conversely obtained therefrom, for example, the refractive index change described above should be improved to ¼ or ⅛ of a general resin. This corresponds to changing the fundamental physical properties of the resin material, which is difficult to realize.

When a material other than a resin, more specifically, glass or the like is used, it is possible to significantly improve refractive index changes resulting from environmental changes to around 1/10 of a case of the resin. In this case, however, it is required to produce every material of a laminated DOE using glass and it is impossible to use a material, such as the material disclosed in Japanese Patent Application Laid-Open No. 2004-78166, where fine particles are dispersed. Therefore, a novel material for improvement of initial performance becomes necessary.

SUMMARY OF THE INVENTION

An object of the present invention is to provide a diffraction optical element that is high change resistance of diffraction efficiency against an environmental deviation and is capable of realizing high diffraction efficiency in a usage wavelength range.

According to an aspect of the Invention, there is provided a diffraction optical element including a plurality of diffraction gratings laminated, in which a maximum optical path length difference of light passing through the plurality of diffraction gratings is integer multiples of a plurality of wavelengths. The diffraction optical element includes a first diffraction grating made of a resin material where inorganic fine particles are dispersed, and a second diffraction grating made of a material whose organic matter composition is substantially the same as organic matter composition of the resin material.

According to another aspect of the Invention, there is provided a diffraction optical element including a plurality of diffraction gratings laminated, in which a maximum optical path length difference of light passing through the plurality of diffraction gratings is integer multiples of a plurality of wavelengths, characterized in that the diffraction optical element includes: a first diffraction grating made of a resin material where inorganic fine particles are dispersed; and a second diffraction grating made of a material having an optical characteristic that is different from an optical characteristic of the resin material where the inorganic fine particles are dispersed, in which the material forming the first diffraction grating and the material forming the second diffraction grating are substantially equal to each other in at least one of a refractive index change depending on temperature change, a linear expansion coefficient, a swelling ratio, and a water absorption coefficient.

DESCRIPTION OF THE PREFERRED EMBODIMENTS

Hereinafter, embodiments of the diffraction optical element according to the present invention will be described with reference to the accompanying drawings.

First Embodiment

Figure 1:
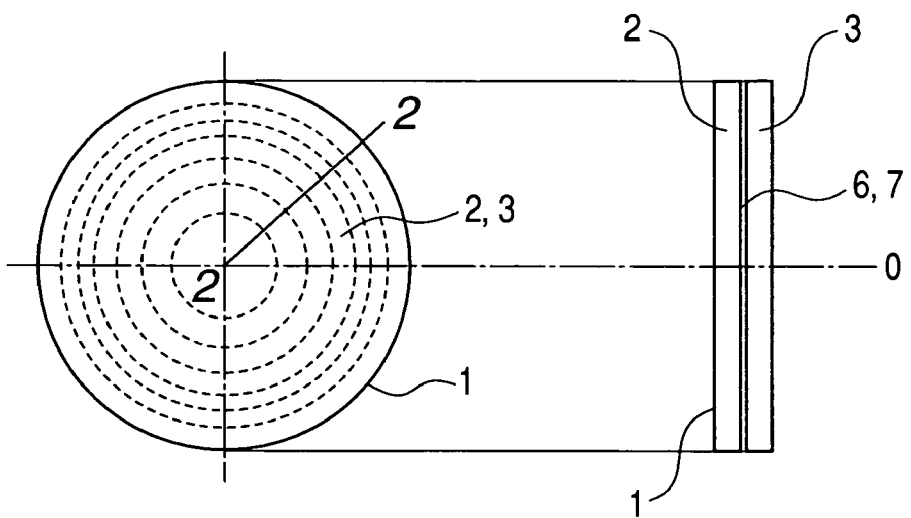
FIG. 1 is a front view and a side view of a diffraction optical element according to a first embodiment.
Figure 2:
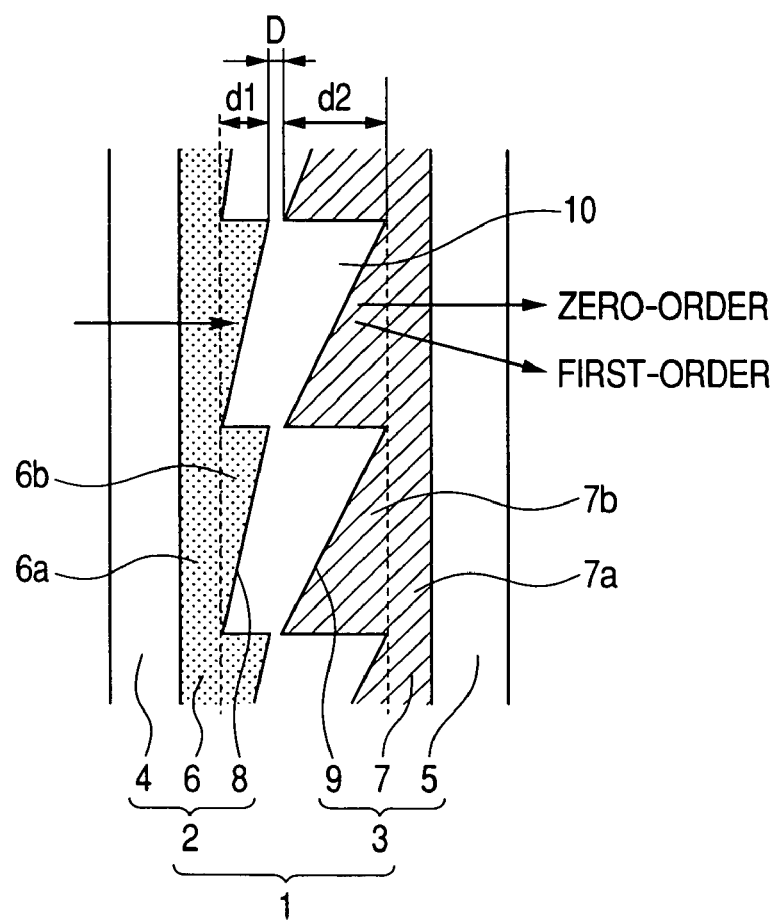
FIG. 2 is an explanatory diagram of the diffraction optical element according to the first embodiment.

FIG. 1 is a front view and a side view of a diffraction optical element according to a first embodiment. FIG. 2 is a partial cross-sectional view where the diffraction optical element shown in FIG. 1 is cut along the line 2-2 shown in FIG. 1. FIG. 2 is a drawing considerably deformed in a grating height (depth) direction for ease of understanding of grating shapes. In FIGS. 1 and 2, a diffraction optical element 1 has a construction (laminated construction) where a first element portion 2 and a second element portion 3 are close-arranged so as to be spaced apart from each other by a distance D.

The first element portion 2 includes a first substrate 4 and a first diffraction grating 6 provided on the first substrate 4. The second element portion 3 includes a second substrate 5 and a second diffraction grating 7 provided on the second substrate 5. A grating surface 8 of the first diffraction grating 6 and a grating surface 9 of the second diffraction grating 7 are set close to each other with an air layer 10 therebetween.

Reference numeral 6b denotes each grating portion forming the first diffraction grating 6, while reference numeral 7b indicates each grating portion forming the second diffraction grating 7. The grating portions 6b and 7b are arranged with predetermined grating pitches (grating periods). The first and second diffraction gratings 6 and 7 each have a concentric grating shape, and a lens function (convergence function or divergence function) is obtained by gradually reducing the grating pitches of the grating portions 6b and 7b in a direction from the center (optical axis) to the periphery.

Also, the diffraction grating 6 of the first element portion 2 and the diffraction grating 7 of the second element portion 3 have approximately the same grating pitch distribution, and the widths of respective opposing grating portions are set approximately equal to each other.

The diffraction gratings 6 and 7 function as one diffraction optical element throughout all layers.

It should be noted here that in this embodiment, a case has been described in which the first element portion 2 and the second element portion 3 are respectively composed of one diffraction grating 6 and one diffraction grating 7, but as will be described in a second embodiment to be explained later, each element portion may have a construction where two or more diffraction grating layers are laminated. In this case, the grating surfaces corresponding to surfaces 8 and 9 in FIG. 2 are to be formed in a boundary surface between two different materials (optical materials) other than the air, while the grating surface 8 of the first diffraction grating 6 and the grating surface 9 of the second diffraction grating 7 are each formed at a boundary surface with the air layer 10.

Also, although the substrates 4 and 5 have been described as flat plates, the surfaces of the substrates 4 and 5, on which the diffraction gratings are provided, are not limited to planes and may be spherical surfaces or aspherical surfaces.

In this embodiment, a resin material where inorganic fine particles are dispersed (hereinafter referred to as "fine particle dispersed resin") is used as a grating forming material 6a constituting the first diffraction grating 6. Also, an ordinary resin material is used as a grating forming material 7a constituting the second diffraction grating 7.

It should be noted here that when the diffraction optical element 1 is configured by the lamination of three or more diffraction gratings, the fine particle dispersed resin may be used as the material of at least one diffraction grating.

Also, $d/P < 1/6$ is satisfied, where P (μm) represents the grating pitch of the grating portions 6b and 7b and d (μm) represents the grating height (grating thickness) of each of the grating portions 6b and 7b.

When this condition is satisfied, it is easy to machine the element itself or a mold for element production in the grating shape.

The usage wavelength range of the diffraction optical element in this embodiment is a visible range. The materials and grating heights of the first diffraction grating 6 and the second diffraction grating 7 are selected so as to raise the diffraction efficiency of the +1st-order diffraction light in the entire visible range. In other words, the materials and grating heights of the respective diffraction gratings are defined so that the maximum optical path length difference (maximum value of the optical path length difference between the peak and valley of the diffraction portion) of light passing through multiple diffraction gratings (diffraction gratings 6 and 7) equals to integer multiples of respective wavelengths for a plurality of wavelengths within the usage wavelength range. By appropriately setting the materials and shapes of the diffraction gratings in this manner, high diffraction efficiency is obtained in the entire usage wavelength range.

In addition, in the diffraction optical element in this embodiment, the material of the first diffraction grating 6 made of the fine particle dispersed resin and the material of the second diffraction grating 7 made of another resin are selected so as to minimize change in the diffraction efficiency resulting from an environmental deviation. More specifically, the fine particle dispersed resin constituting the first diffraction grating 6 and the resin material constituting the second diffraction grating 7 are selected from materials satisfying one or more conditions: materials whose refractive index changes resulting from a temperature change are substantially equal to each other; materials whose linear expansion coefficients are substantially equal to each other; materials whose swelling ratios are substantially equal to each other; or materials whose water absorption coefficients are substantially equal to each other.

As the fine particles, it is possible to use at least one of $TiO_2$, $Nb_2O_5$, $Cr_2O_3$, $BaTiO_3$, and ITO (Indium Tin Oxide). The fine particles are dispersed in the resin at a volume ratio of 5% or more and less than 25% in the material 6a of the diffraction grating 6 and the Abbe constant of the material 6a of the diffraction grating 6, in which the fine particles are dispersed, is 30 or less.

Next, the diffraction efficiency of the diffraction optical element 1 of this embodiment will be described.

A condition under which the diffraction efficiency of diffraction light on an order for the design wavelength $\lambda 0$ becomes the maximum in a laminated DOE where two or more diffraction gratings are laminated is that a sum of optical path length differences between the respective peaks and valleys of the grating portion (that is, a sum of differences in optical path lengths between light beams that respectively pass through the vertex and valley bottom of a mountain) for every diffraction grating becomes an integer multiple of the wavelength.

Accordingly, a conditional expression with which the diffraction efficiency of the diffraction light on a diffraction order m becomes the maximum for the design wavelength $\lambda 0$ in the diffraction optical element 1 in this embodiment shown in FIGS. 1 and 2 becomes as follows, $$\pm(n01-1)d1 \pm (n02-1)d2 = m\lambda 0 \quad (1),$$

where n01 is the refractive index of the material of the first diffraction grating 6 for the wavelength $\lambda 0$, n02 is the refractive index of the material of the second diffraction grating 7 for the wavelength $\lambda 0$, d1 and d2 are respectively the grating heights of the first diffraction grating 6 and the second diffraction grating 7, and m is a diffraction order.

Here, when a light beam diffracted downwardly with respect to the zero-order diffraction light in FIG. 2 is referred to as the positive diffraction order and a light beam diffracted upwardly with respect to the zero-order diffraction light in FIG. 2 is referred to as the negative diffraction order, the sign of the grating height of each layer in Expression (1) is positive in the case of a grating shape (second diffraction grating 7 in the figure) where the grating height decreases from the bottom to the top in the figure and is negative in the case of a grating shape (first diffraction grating 6 in the figure) where the grating height of the grating portion conversely increases from the bottom to the top. That is, in the construction shown in FIG. 2, it is possible to rewrite Expression (1) as follows.

$$-(n01-1)d1 + (n02-1)d2 = m\lambda 0 \quad (2)$$

In the construction shown in FIG. 2, it is possible to express the diffraction efficiency $\eta(\lambda)$ at a wavelength $\lambda$ other than the design wavelength $\lambda 0$ as follows.

$$\eta(\lambda) = \operatorname{sinc}^2[\pi\{M - \{-(n1(\lambda)-1)d1 + (n2(\lambda)-1)d2\}/\lambda\}] \quad (3)$$
$$= \operatorname{sinc}^2[\pi\{M - \Phi(\lambda)/\lambda\}]$$

In Expression (3), $\Phi(\lambda)$ is as follows, $$\Phi(\lambda) = -\{n1(\lambda)-1\}d1 + \{n2(\lambda)-1\}d2 \quad (4),$$

where M is the order of diffraction light that should be evaluated, $n1(\lambda)$ is the refractive index of the material of the first diffraction grating 6 at the wavelength $\lambda$, $n2(\lambda)$ is the refractive index of the material of the second diffraction grating 7 at the wavelength $\lambda$, and d1 and d2 are respectively the grating heights of the grating portions 6b and 7b.

Next, a deviation of the diffraction efficiency in the case where the characteristics of the materials of the diffraction optical element have changed due to an environmental deviation will be described. Characteristics that change due to an environmental change in Expression (3) concerning the diffraction efficiency $\eta(\lambda)$ are the refractive indices of the materials and the grating heights. That is, it is sufficient that a change of $\Phi(\lambda)$ due to an environmental deviation is considered. When the amounts of the changes of the refractive indices of the materials and the grating heights due to an environmental change are respectively referred to as $\Delta n1(\lambda)$, $\Delta n2(\lambda)$, $\Delta d1$, and $\Delta d2$, Expression (4) becomes as follows, $$\Phi(\lambda, \Delta n, \Delta d) = -\{n1(\lambda) + \Delta n1(\lambda) - 1\}(d1 + \Delta d1) + \quad (5)$$
$$\{n2(\lambda) + \Delta n2(\lambda) - 1\}(d2 + \Delta d2).$$

Then, Expression (5) is rearranged as follows, $$\Phi(\lambda, \Delta n, \Delta d) = -\{n1(\lambda) - 1\}d1 + \{n2(\lambda) - 1\}d2 - \Delta n1(\lambda)d1 + \quad (6)$$
$$\Delta n2(\lambda)d2 - \{n1(\lambda) - 1\}\Delta d1 + \{n2(\lambda) - 1\}\Delta d2 -$$
$$\Delta n1(\lambda)\Delta d1 + \Delta n2(\lambda)\Delta d2$$
$$= \Phi(\lambda) + \Phi(\Delta n) + \Phi(\Delta d) + \Phi(\Delta n, \Delta d),$$

where $\Phi(\Delta n)$, $\Phi(\Delta d)$, and $\Phi(\Delta n, \Delta d)$ in the above expression are as follows, $$\Phi(\Delta n) = -\Delta n1(\lambda)d1 + \Delta n2(\lambda)d2 \quad (7)$$

$$\Phi(\Delta d) = -\{n1(\lambda)-1\}\Delta d1 + \{n2(\lambda)-1\}\Delta d2 \quad (8)$$

$$\Phi(\Delta n, \Delta d) = -\Delta n1(\lambda)\Delta d1 + \Delta n2(\lambda)\Delta d2 \quad (9).$$

In order to simplify the following description of the first embodiment, it is assumed that it is possible to neglect the wavelength dependency of the refractive index change $\Delta n(\lambda)$ and it is possible to neglect a value $\Phi(\Delta n, \Delta d)$ multiplied by change amounts because the change amounts $\Delta n(\lambda)$ and $\Delta d$ are relatively smaller than $n(\lambda)$ and d.

Accordingly, it can be understood from Expression (6) that $\Phi(\lambda, \Delta n, \Delta d)$, which is change in $\Phi(\lambda)$ due to an environmental change, is a characteristic where a change $\Phi(\Delta n)$ ascribable to a deviation of the refractive index and a change $\Phi(\Delta d)$ ascribable to a deviation of the grating height are added to $\Phi(\lambda)$ stipulating the initial diffraction efficiency.

The diffraction optical element in the first embodiment is characterized in that it is possible to significantly reduce each of $\Phi(\Delta n)$ and $\Phi(\Delta d)$. In the laminated DOE, as described above, at least one pair of diffraction gratings exists whose grating height increasing directions are opposite to each other. Therefore, for diffraction gratings whose grating height changing directions are opposite to each other, that is, diffraction gratings whose degree signs are different from each other in the expression, materials are adopted whose refractive index deviations or grating height deviations due to an environmental change are equal to each other. With this construction, the deviation amounts occurring at the respective diffraction gratings cancel each other. As a result, $\Phi(\Delta n)$ and $\Phi(\Delta d)$ occurring in the system constructed as the laminated DOE are significantly reduced.

Therefore, first, in the diffraction optical element in this embodiment, as a construction that significantly improves the initial diffraction efficiency (diffraction efficiency in terms of design), a resin where the inorganic fine particles described above are dispersed in a grating forming material is used. In order to improve the initial diffraction efficiency characteristic in Expression (3), at least one pair of diffraction gratings made of the fine particle dispersed resin and having opposite grating height changing directions is used.

Next, in order to suppress a diffraction efficiency change due to an environmental change, materials whose characteristic changes due to an environmental deviation are substantially equal to each other are adopted for the diffraction grating made of the fine particle dispersed resin and for the diffraction grating made of a resin other than the fine particle dispersed resin and having a different grating height changing direction.

In the above description, as a factor of a change of the characteristic of the diffraction efficiency due to an environmental change, the refractive indices of the materials of the diffraction gratings and the grating heights are considered. More specifically, for a refractive index change due to an environmental change, a refractive index change dn/dt due to a temperature change is considered. For a grating height change, expansion due to a temperature change (linear expansion coefficient) and expansion due to a humidity change (swelling ratio) are considered.

When they are considered, corresponding Expression (7) and Expression (8) become as follows, $$\Phi(\Delta n) = -(dn1/dt)\Delta t d1 + (dn2/dt)\Delta t d2, \quad (10)$$

$$\Phi(\Delta d) = \Phi(\Delta dt) + \Phi(\Delta dh) \quad (11)$$
$$= -\{n1(\lambda) - 1\}(1 + \alpha1\Delta t)d1 + \{n2(\lambda) - 1\}(1 + \alpha2\Delta t)d2 - \{n1(\lambda) - 1\}(1 + \beta1)d1 + \{n2(\lambda) - 1\}(1 + \beta2)d2,$$

here, $\Phi(\Delta dt)$ and $\Phi(\Delta dh)$ are as follows, $$\Phi(\Delta dt) = -\{n1(\lambda) - 1\}(1 + \alpha1 * \Delta t)d1 + \{n2(\lambda) - 1\}(1 + \alpha2 * \Delta t)d2, \quad (12)$$

$$\Phi(\Delta dh) = -\{n1(\lambda) - 1\}(1 + \beta1)d1 + \{n2(\lambda) - 1\}(1 + \beta2)d2, \quad (13)$$

where dn1/dt and dn2/dt are respectively the refractive index change ratios due to a temperature change of the materials of the first diffraction grating 6 and the second diffraction grating 7, $\Delta t$ is the temperature change amount, $\Phi(\Delta dt)$ is the grating height change component due to the temperature change, $\Phi(\Delta dh)$ is the grating height change component due to a humidity change, $\alpha 1$ and $\alpha 2$ are respectively the linear expansion coefficients of the materials of the first diffraction grating 6 and the second diffraction grating 7, and $\beta 1$ and $\beta 2$ are respectively the swelling ratios of the materials 6a and 7a of the first diffraction grating 6 and the second diffraction grating 7.

Next, the features of the first embodiment will be described in detail based on an example of an actual construction of the diffraction optical element.

A resin material (nd=1.567, vd=20.8) where the inorganic fine particles are mixed at a volume ratio of 10% is used as the material of the first diffraction grating 6 and the grating height d1 is set at 11.12 μm. An ultraviolet curing resin C001 (nd=1.524, vd=50.8) manufactured by Dainippon Ink and Chemicals Incorporated is used as the material of the second diffraction grating 7 and the grating height d2 is set at 13.15 μm.

Figure 3:
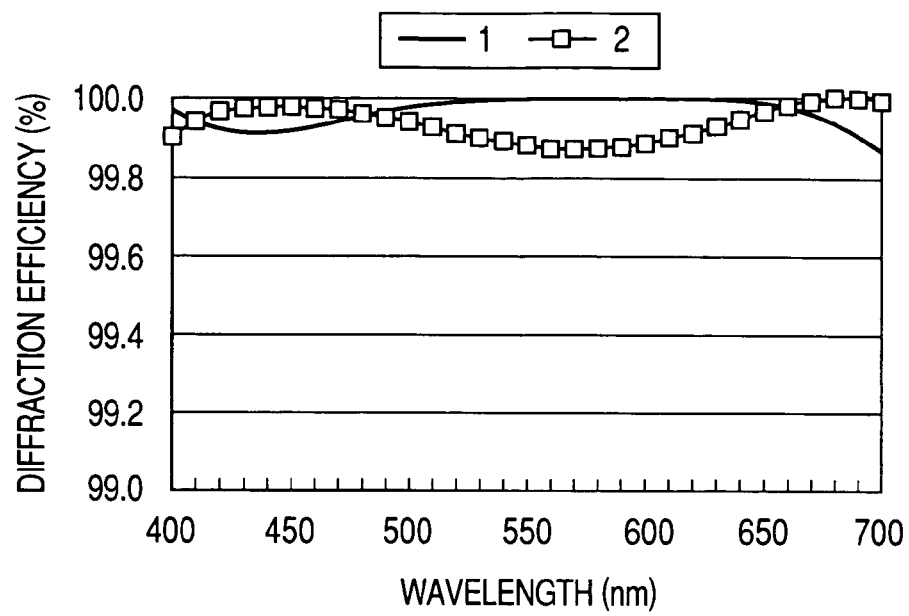
FIG. 3 is an explanatory diagram of diffraction efficiency under an initial condition and an environmental change condition on a design order of the diffraction optical element according to the first embodiment.

In FIG. 3, characteristics of the diffraction efficiency on the design order (+1st-order) of the diffraction optical element are shown.

Figure 4:
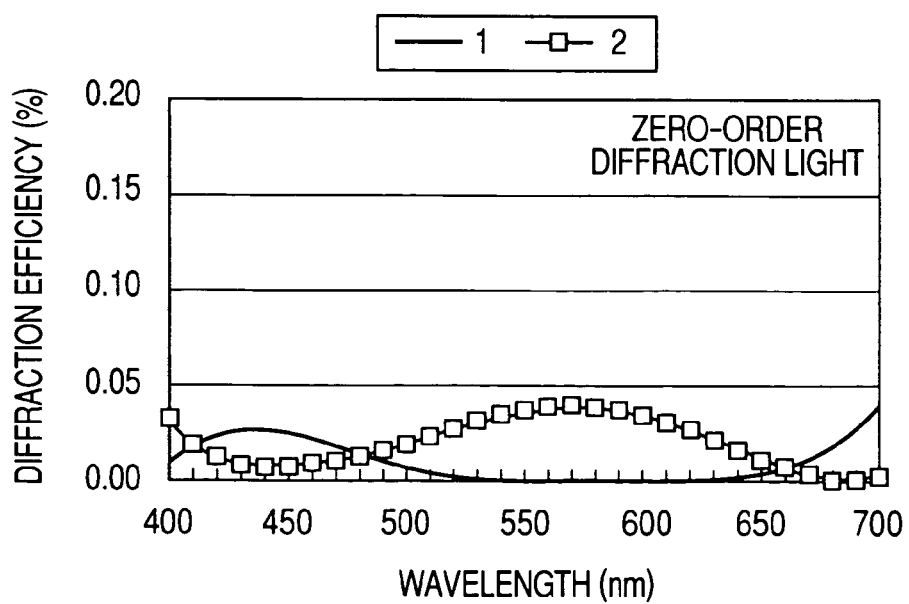
FIG. 4 is an explanatory diagram of diffraction efficiency under an initial condition and an environmental change condition on the zero-order of the diffraction optical element according to the first embodiment.
Figure 5:
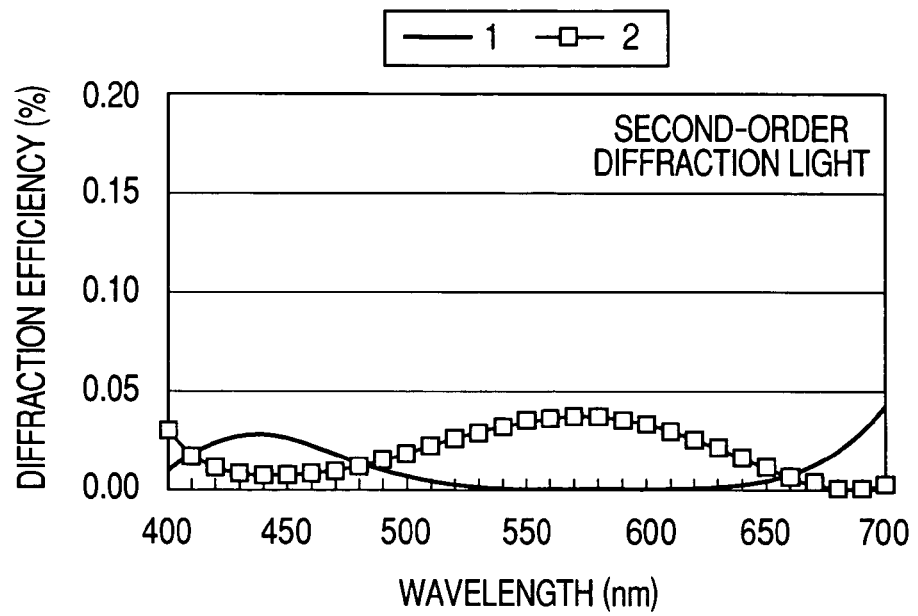
FIG. 5 is an explanatory diagram of diffraction efficiency under an initial condition and an environmental change condition on the 2nd-order of the diffraction optical element according to the first embodiment.

Also, characteristics of the diffraction efficiency on the zero-order and the +2nd-order that are orders of "+1st-order (design order)±1-order" are respectively shown in FIGS. 4 and 5. The diffraction efficiency on the design order becomes 99.8% or more in the entire visible range and the flare light on unnecessary orders also becomes 0.05% or less in the entire visible range accordingly.

Here, the zero-order diffraction light and the +second-order diffraction light are only considered for the diffraction efficiency as to the unnecessary order light because the ratio of contribution to the flare decreases as the diffraction order differs from the design order. When the flare light on the zero-order and the +2nd-order, close to the design order, is reduced, the influence of the flare light due to other higher-order diffraction light can be also reduced in a like manner. This is ascribable to a fact that a diffraction optical element designed to mainly diffract light on a specific design order has a tendency that diffraction efficiency decreases as a diffraction order differs from the design order and a fact that an imaging surface blurs and flare becomes inconspicuous as the diffraction order differs from the design order.

Figure 6:
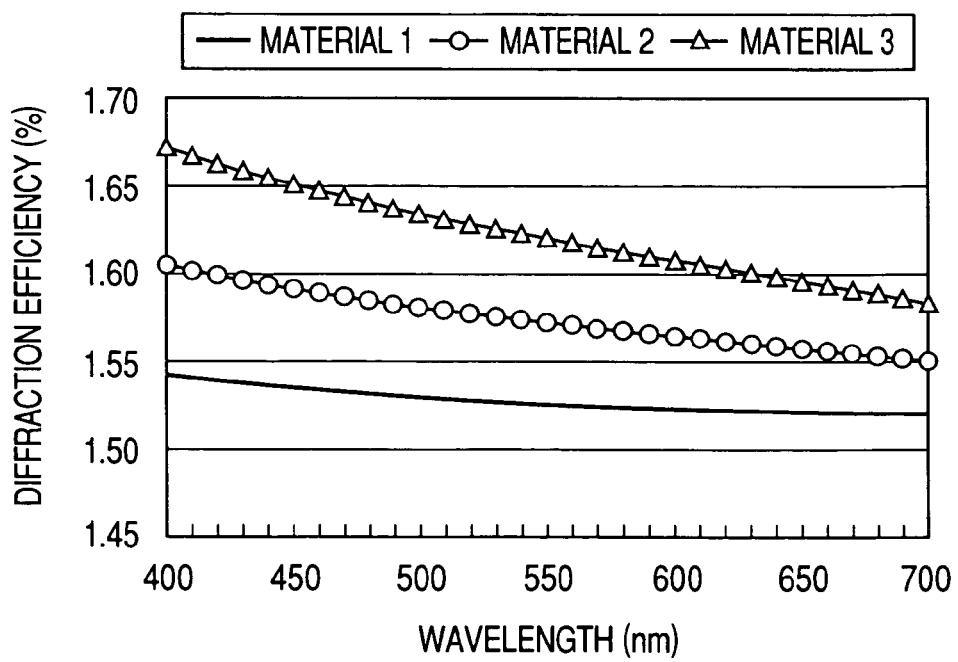
FIG. 6 is an explanatory diagram of the refractive index characteristic (nd-λ diagram) of a material of the diffraction optical element according to the first embodiment.

FIG. 6 shows the refractive index characteristics of the materials of the diffraction gratings 6 and 7 of which the diffraction optical element 1 is made in the visible wavelength range. In FIG. 6, material 1 is a material of which the second diffraction grating 7 is made and material 2 is the fine particle dispersed resin material of which the first diffraction grating 6 is made. It can be seen from FIG. 6 that each of the materials changes in refractive index linearly with respect to the wavelength.

Figure 7:
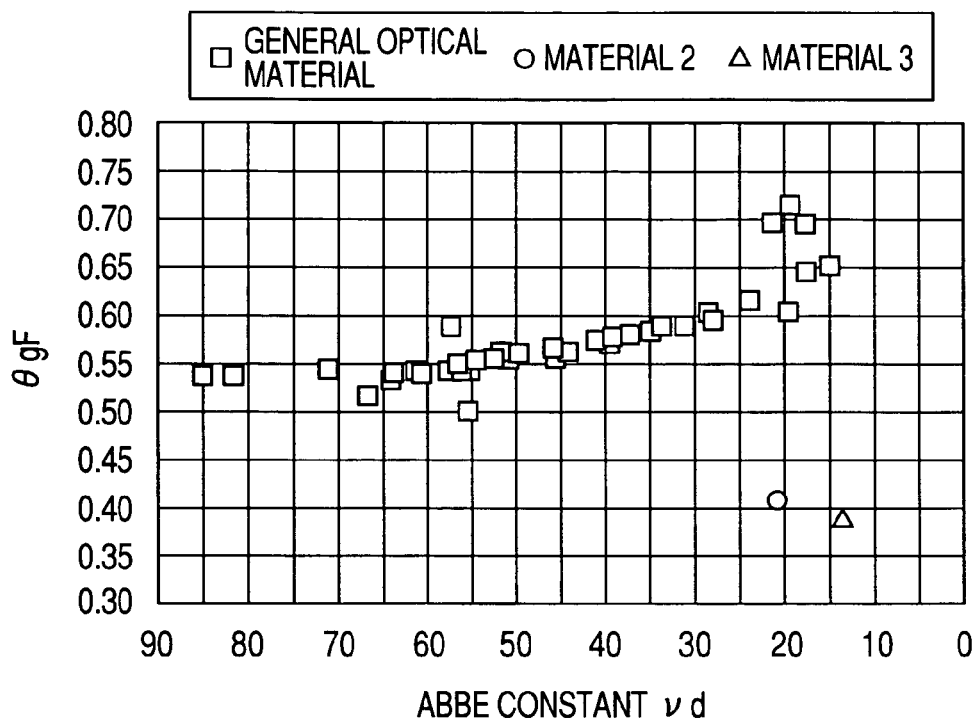
FIG. 7 is another explanatory diagram of the refractive index characteristic (θgF-vd diagram) of the material of the diffraction optical element according to the first embodiment.

FIG. 7 shows the partial dispersion characteristics of the materials. The horizontal axis vd and the vertical axis θgF respectively represent values defined as follows, $$vd=(nd-1)/(nF-nC) \quad (14),$$

$$\theta gF=(ng-nF)/(nF-nC) \quad (15),$$

where nd, ng, nF, and nC are respectively the refractive indices with respect to d-line, g-line, F-line, and C-line.

In FIG. 7, material 2 is the fine particle dispersed resin material adopted for the first diffraction grating 6. It can be seen from FIG. 7 that the material 2 has a special characteristic where the partial dispersion is small as compared with a general optical material.

Next, a diffraction efficiency change due to an environmental change will be described. Curve 2 in FIGS. 3 to 5 represents the diffraction efficiency in the case where a refractive index change has occurred due to a temperature change in the material and construction described above. It can be understood that very favorable suppression is achieved in which, for instance, the deviation of the diffraction efficiency on the +1st-order that is the design order is suppressed to 0.2% or less and the deviation of the diffraction efficiency as to the zero-order and +2ond-order diffraction light that is unnecessary diffraction light is also suppressed to 0.05% or less. Here, the temperature change $\Delta t$ is set to 30° C.

Figure 14:
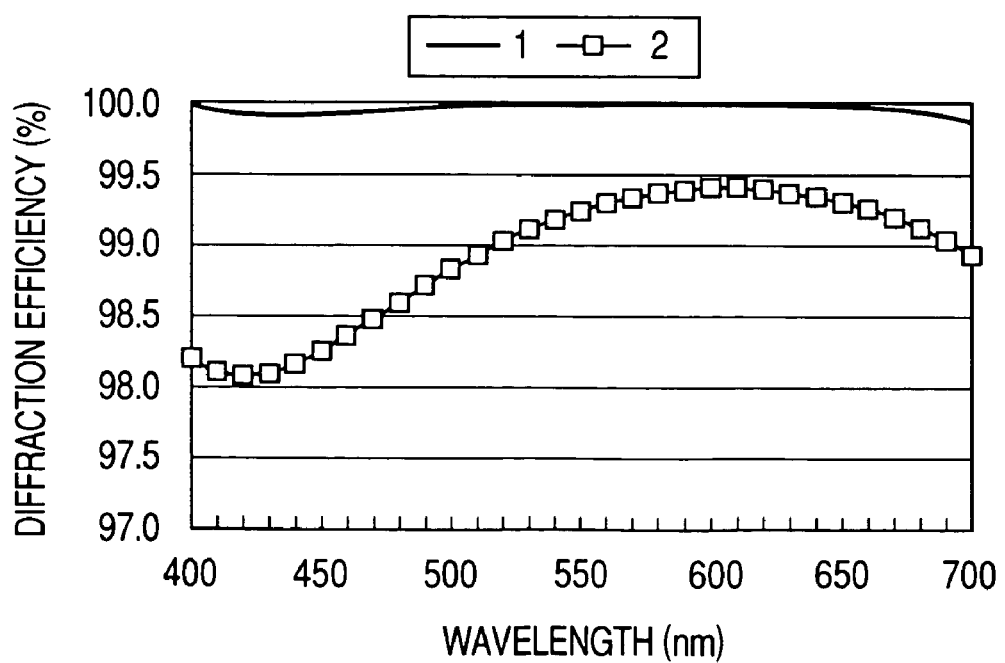
FIG. 14 is an explanatory diagram of diffraction efficiency as to diffraction light on the design order of a conventional diffraction optical element.
Figure 15:
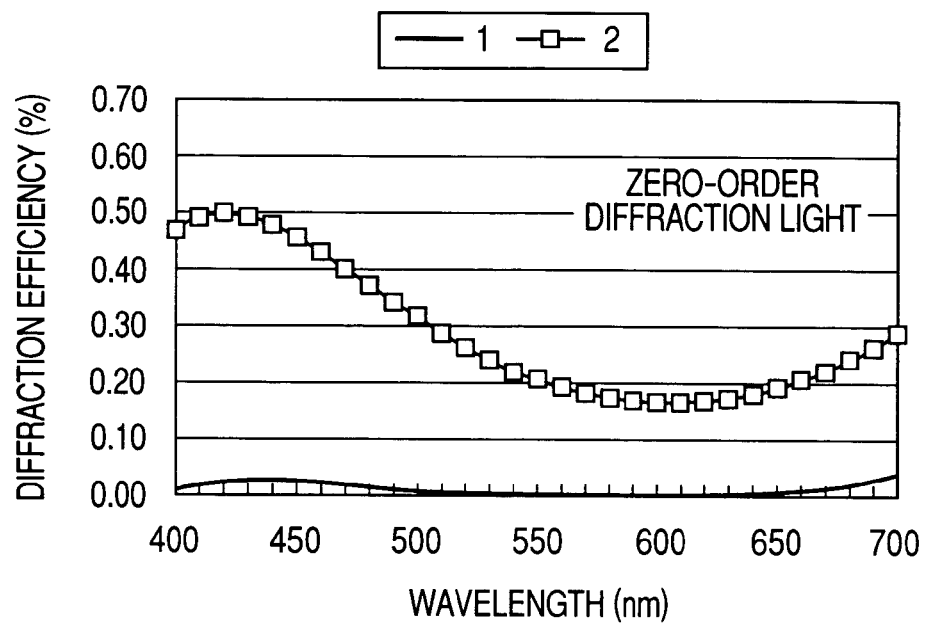
FIG. 15 is an explanatory diagram of diffraction efficiency as to zero-order diffraction light of the conventional diffraction optical element.
Figure 16:
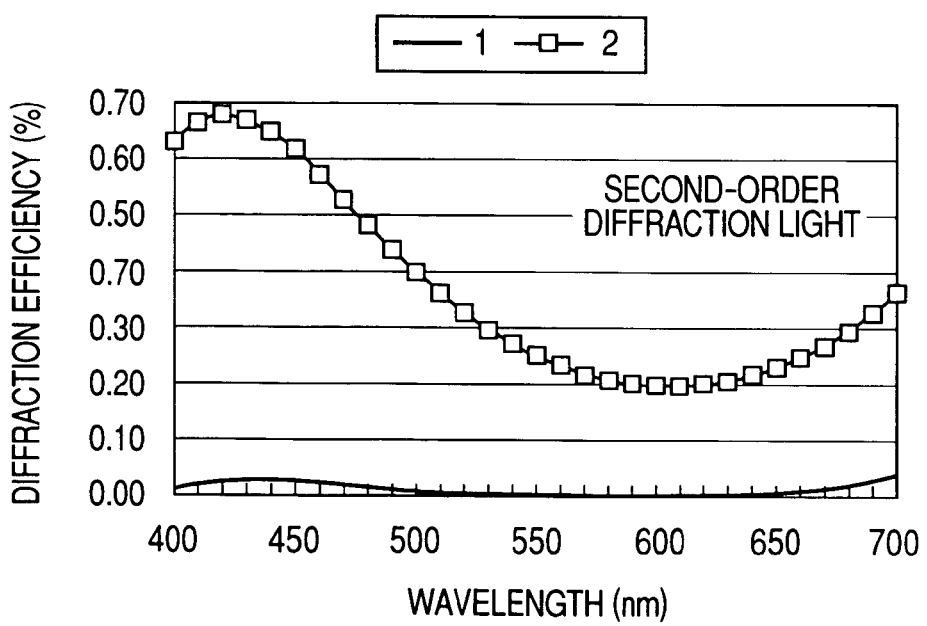
FIG. 16 is an explanatory diagram of diffraction efficiency as to +2nd-order diffraction light of the conventional diffraction optical element.

The refractive index change dn/dt due to a temperature change of the ultraviolet curing resin C001 constituting the second diffraction grating 7 is $-1.45 \times 10^{-4}/°$ C. and the refractive index change dn/dt due to the temperature change of the fine particle dispersed resin constituting the first diffraction grating 6 is $-1.4 \times 10^{-4}/°$ C. The refractive index change dn/dt due to the temperature change of a conventional fine particle dispersed resin indicated by the curve 2 in FIGS. 14 to 16 is $-2.5 \times 10^{-4}/°$ C. Therefore, it is possible to consider that the characteristic of a refractive index change due to a temperature change of the fine particle dispersed resin used in the first embodiment is approximately equal to that of the resin constituting the second diffraction grating 7. Here, a diffraction optical element in a conventional example for comparison is assumed to have completely the same construction as the first embodiment of the present invention for the sake of strict comparison with the diffraction optical element in the first embodiment of the present invention as to a diffraction efficiency change due to an environmental change and only the value of a refractive index change due to the temperature change is set as the characteristic of a conventional fine particle dispersed material. Therefore, the initial diffraction efficiencies in FIGS. 3 to 5 and FIGS. 14 to 16 become completely the same.

It can be understood from the above description that for suppression of a diffraction efficiency change due to an environmental change it is effective that the deviation characteristic with respect to the environmental change of the material forming the first diffraction grating 6 and that of the material forming the second diffraction grating 7 are set substantially equal to each other.

In order to set the deviation characteristic with respect to the environmental change of the fine particle dispersed resin as substantially equal to that of another material, it is sufficient that optimum materials are selected with consideration given to the environmental characteristics of both of the resin and the fine particles mixed thereinto. It has been substantially impossible to select materials so that initial diffraction efficiency is improved and an influence of an environmental change is reduced in a laminated DOE that has not used a conventional fine particle dispersed resin. However, in the fine particle dispersed resin, two kinds of materials that are the inorganic fine particles and the resin are mixed with each other, so it becomes relatively easy to cope with both improvement of the initial characteristic and improvement of the environmental characteristic.

The improvement of the environmental characteristic that is one of the objects of the present invention is realized through adjustment of the mixing amount of the fine particles into the resin. The characteristic change due to the environmental change of the fine particles themselves assumes a sufficiently small value as compared with a general resin material, so the environmental characteristic improvement becomes possible. On the other hand, by adjusting the volume ratio between the resin and the fine particles, it becomes possible to adjust the optical characteristics (refractive index, Abbe constant, and the like) as the fine particle dispersed resin. When the mixing amount of the fine particles into the resin is decreased, the optical characteristics approach the characteristics of the resin. On the other hand, when the mixing amount of the fine particles is increased, the optical characteristics approach the characteristics of the fine particles.

However, from the viewpoint of suppression of the influence of the environmental change, when the mixing amount of the fine particles is increased too much, the characteristics with respect to the environmental change of the fine particle dispersed resin are improved, so that the characteristics of the fine particle dispersed resin and the characteristics of the second diffraction grating 7 favorably cannot cancel each other. As a result, as a whole, a characteristic deviation due to an environment change of the laminated DOE becomes large. Therefore, by reducing the mixing amount of the fine particles and by setting the characteristics of the resin, in which the fine particles are mixed, substantially equal to those of the resin constituting the second diffraction grating 7, the characteristics as the fine particle dispersed resin also approaches those of the resin constituting the second diffraction grating 7. As a result, as a whole, a characteristic deviation due to an environmental change of the laminated DOE is significantly improved as shown in FIG. 3.

In an actual construction, favorable performance is obtained using a fine particle dispersed resin where the fine particles are mixed at a volume ratio of 10%. The fine particle dispersed resin in the above description will be described in more detail. As the resin in which the fine particles are mixed, a resin that is the same as the resin (ultraviolet curing resin C001 described above) constituting the second diffraction grating 7 is used. That is, the inorganic fine particle dispersed resin and the resin constituting the second diffraction grating 7 are materials having the same organic matter composition.

With this construction, it becomes possible to bring the characteristics of the mixed resin into complete agreement with those of the resin constituting the second diffraction grating 7. Therefore, it becomes possible to set the characteristics of the fine particle dispersed resin close to those of the resin constituting the second diffraction grating 7. In reality, even when the materials are not resin materials having completely the same organic matter composition, there occurs no problem. For instance, even when an additive, such as a mold releasing agent, is mixed, the organic matter composition does not change significantly, so the environmental change characteristics of the material do not change.

From the viewpoint of improvement of the environmental characteristic, it is desirable to reduce the mixing ratio of the fine particles, however when the mixing ratio is extremely reduced, it becomes impossible to obtain desired optical performance for obtainment of an initial diffraction efficiency characteristic. Therefore, it is desirable that the mixing ratio of the fine particles be set in a range of 5% to 25% in terms of the volume ratio.

Also, in order to obtain necessary optical performance as the fine particle dispersed resin with a small mixing amount of the fine particles, it is desirable that a fine particle material having a characteristic where the Abbe constant vd is 15 or less (preferably, in a range of 5 to 15) be used as the fine particles. More specifically, it is sufficient that fine particles of $TiO_2$, $Nb_2O_5$, $Cr_2O_3$, $BaTiO_3$, ITO, or the like be used.

As can be understood from Expressions (10) and (11), a diffraction efficiency change resulting from an environmental change is influenced by the grating heights d1 and d2 of the diffraction gratings. Accordingly, when it is possible to reduce the grating heights d1 and d2 of the grating portions, it becomes possible to improve the characteristic change due to the environmental change. In order to reduce the grating heights, it is preferable that the Abbe constant of the fine particle dispersed resin forming the first diffraction grating 6 be set to 30 or less. Also, in a like manner, it is preferable that the Abbe constant of the resin forming the second diffraction grating 7 be set to 40 or more.

Figure 8:
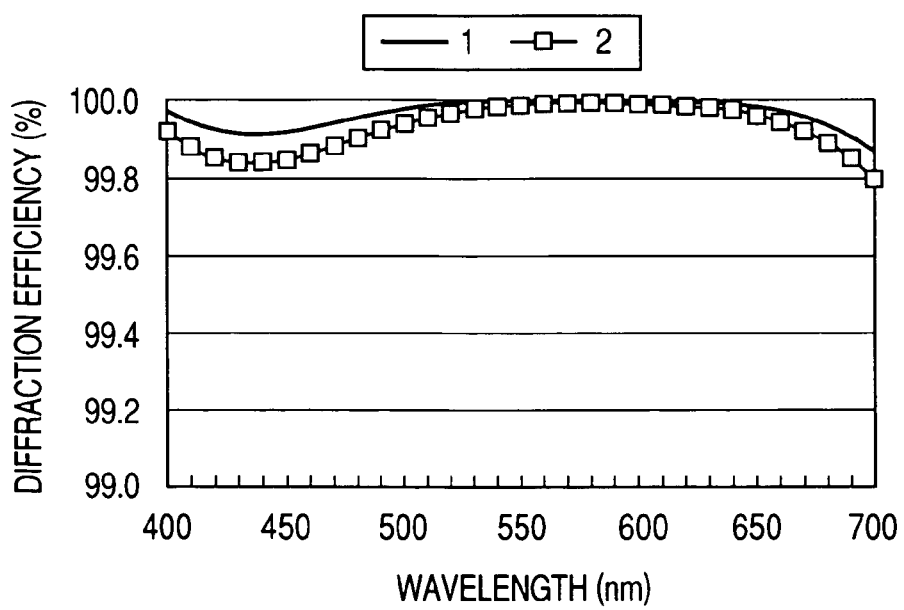
FIG. 8 is an explanatory diagram of diffraction efficiency on the design order in another environmental change of the first embodiment.

Next, a case where a grating height changes due to an environmental change will be described. FIG. 8 shows the diffraction efficiency on the design order (+1st-order) in the case where a grating height is changed due to a temperature change in the material and construction used in this embodiment. It can be understood that the diffraction efficiency deviation on the design order is favorably suppressed to 0.2% or less. Here, the temperature change Δt is set to 30° C.

The linear expansion coefficient α1 of the resin (ultraviolet curing resin C001 described above) constituting the second diffraction grating 7 is $7.9 \times 10^{-5}/°$ C. and the linear expansion coefficient α2 of the fine particle dispersed resin constituting the first diffraction grating 6 is $7.1 \times 10^{-5}/°$ C. Even in this case, it is possible to consider that the linear expansion coefficient characteristic of the fine particle dispersed resin in the first embodiment is approximately equal to that of the resin constituting the second diffraction grating 7.

Figure 9:
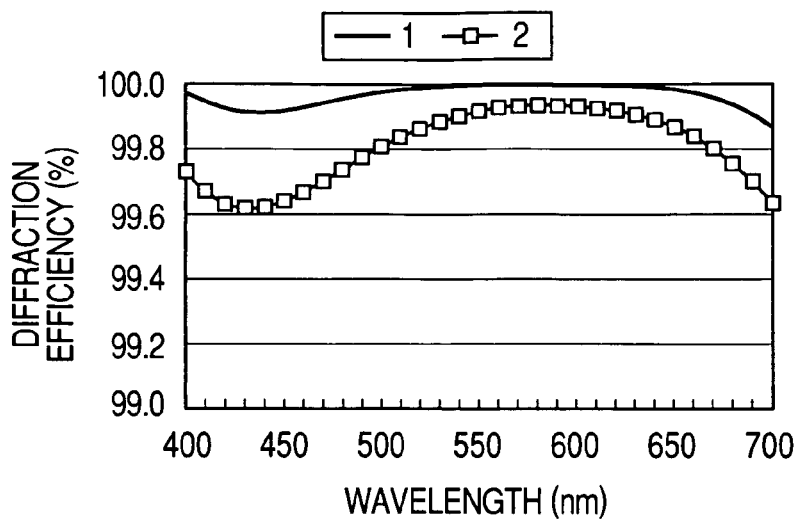
FIG. 9 is an explanatory diagram of diffraction efficiency on the design order in another environmental change of the first embodiment.

FIG. 9 shows the diffraction efficiency in the case where a grating height is changed to the grating portion due to a humidity change in the material and construction used in the present invention. It is possible to say that the deviation of the diffraction efficiency on the +1st-order that is the design order is favorably suppressed to 0.4% although the deviation is larger than that in the cases shown in FIGS. 3 and 8.

The swelling ratio β1 of the resin (ultraviolet curing resin C001 described above) constituting the second diffraction grating 7 is 0.7% and the swelling ratio β2 of the fine particle dispersed resin constituting the first diffraction grating 6 is 0.63%. Even in this case, it is possible to consider that the swelling ratio characteristic of the fine particle dispersed resin in the first embodiment is approximately same as that of the resin constituting the second diffraction grating 7.

Here, generally, the value of the swelling ratio is a value expressing a volume change ratio resulting from water absorption by the material. However, in the construction shown in FIG. 2 of this embodiment, the first diffraction grating 6 and the second diffraction grating 7 are formed on the substrates 4 and 5. The substrates 4 and 5 are generally made of a material, such as glass, where an expansion characteristic depending on an environmental change is small, so the degree of expansion due to the environmental change of the diffraction gratings 6 and 7 is suppressed through constraint by the substrates in the grating periodic direction and a direction vertical to the paper plane of FIG. 2. Therefore, in the first embodiment shown in FIG. 9, the calculations are performed with an assumption that the expansion occurs only in the grating height direction.

It can be understood that as described above, for the sake of suppression of a diffraction efficiency change due to an environmental change, it is effective that the characteristics of the materials of the two diffraction gratings 6 and 7 are set substantially equal to each other so as to favorably cancel each other characteristics of the diffraction grating 6 formed using the fine particle dispersed resin and characteristics of the diffraction grating 7 formed using a resin other than the fine particle dispersed resin and having a different grating thickness increasing direction. Here, when 90% or more of characteristics of a material coincide with those of another material in the diffraction efficiency deviation described above, it is possible to consider that the two materials are substantially equal to each other. More specifically, the refractive index changes dn1/dt and dn2/dt, the linear expansion coefficients α1 and α2, and the swelling ratios β1 and β2 are as follows.

$$0.9 \leq dn1/dt/dn2/dt \leq 1.1 \quad (16)$$

$$0.9 \leq \alpha1/\alpha2 \leq 1.1 \quad (17)$$

$$0.9 \leq \beta1/\beta2 \leq 1.1 \quad (18)$$

In the above description, a case where respective characteristics independently change due to an environmental change has been explained as an example. In reality, when temperature changes, refractive index and grating height change simultaneously. However, when each diffraction efficiency change due to a factor is suppressed in the manner described in the first embodiment of the present invention, even when multiple factors have occurred, it becomes possible to favorably suppress a diffraction efficiency deviation.

Also, in the first embodiment described above, the diffraction optical element using so-called 1st-order diffraction light, whose design order is the +1st-order, has been described. However the design order is not limited to the +1st-order and even in the case of diffraction light on the +2nd-order, the +3rd-order, or the like, when the synthesized optical path length difference of the diffraction optical element is set so as to become a desired design wavelength on a desired design order, the same effects as in the first embodiment described above can be obtained.

Second Embodiment

Figure 10:
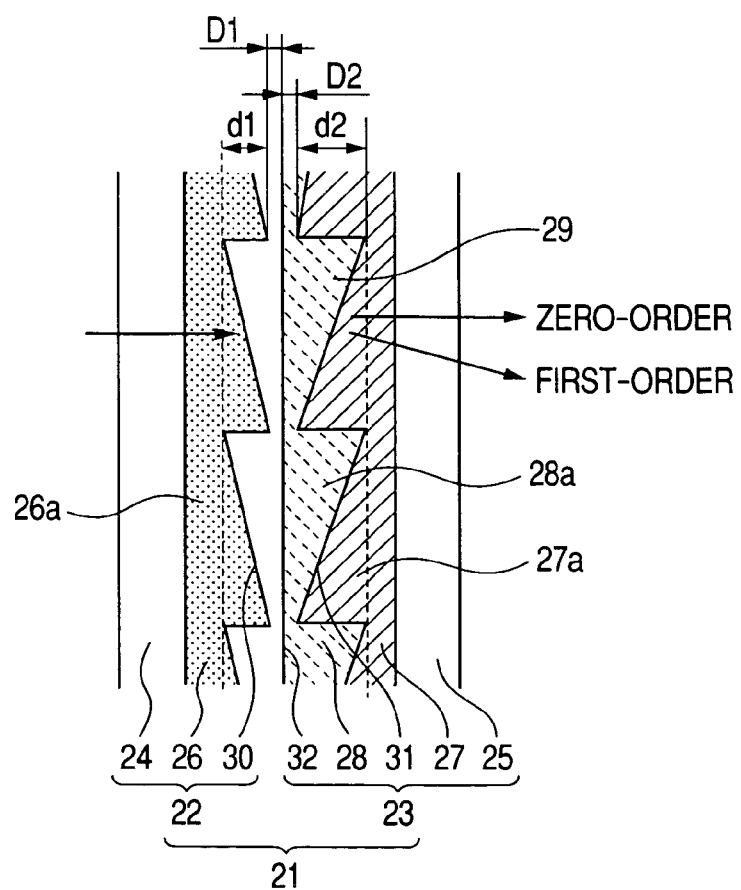
FIG. 10 is a cross-sectional view of a diffraction optical element according to a second embodiment.

In the first embodiment described above, a case has been explained in which each element portion is composed of one diffraction grating, but the present invention is not limited to this. For instance, the present invention may be applied to a diffraction optical element shown in FIG. 10 that includes three diffraction gratings. The construction shown in the drawing is a construction where a first element portion 22 having a first diffraction grating 26 provided on a substrate 24 and a second element portion 23 having a second diffraction grating 27 and a third diffraction grating 28 provided on a substrate 25 are set close to each other with an air layer 29 therebetween. The second element portion 23 has a construction where the second diffraction grating 27 made of a second material is bonded to a surface side of the substrate 25 and is also bonded to the third diffraction grating 28 made of a third material through a grating surface 31. A surface 32 on a side opposite to the grating surface 31 of the third diffraction grating 28 made of the third material is a plane where no grating is formed. In this construction, when the second material is set as the resin constituting the second diffraction grating 7 in the first embodiment and the third material is set as the fine particle dispersed resin constituting the first diffraction grating 6, it becomes possible to obtain a construction of the second element portion 23 in which almost no characteristic change due to an environmental change occurs. As a result, when the first element portion 22 is made of glass or the like, it becomes possible to significantly suppress an influence of an environmental change on the laminated DOE as a whole.

Third Embodiment

In the first embodiment, the fine particle dispersed material is used in which the mixing ratio of the fine particles is set at 10% in terms of the volume ratio, but the mixing ratio of the fine particles is not limited to 10%. As an example, a case will be described in which the mixing ratio of the fine particles of the fine particle dispersed resin forming the first diffraction grating 6 is set at 20% in the same construction as in the first embodiment. In this case, the optical characteristics of the fine particle dispersed resin become nd=1.611, vd=13.6, θgF=0.39, the wavelength characteristic of the refractive index becomes that of the material 3 shown in FIG. 6, and the partial dispersion ratio becomes that of the material 3 shown in FIG. 7.

In a laminated DOE using this fine particle dispersed resin, the grating height d1 of the first grating portion 6b is 5.34 μm and the grating height d2 of the second grating portion 7b is 7.35 μm. The Abbe constant of the fine particle dispersed resin is significantly reduced, so the grating heights are approximately halved from those in the first embodiment.

Figure 11:
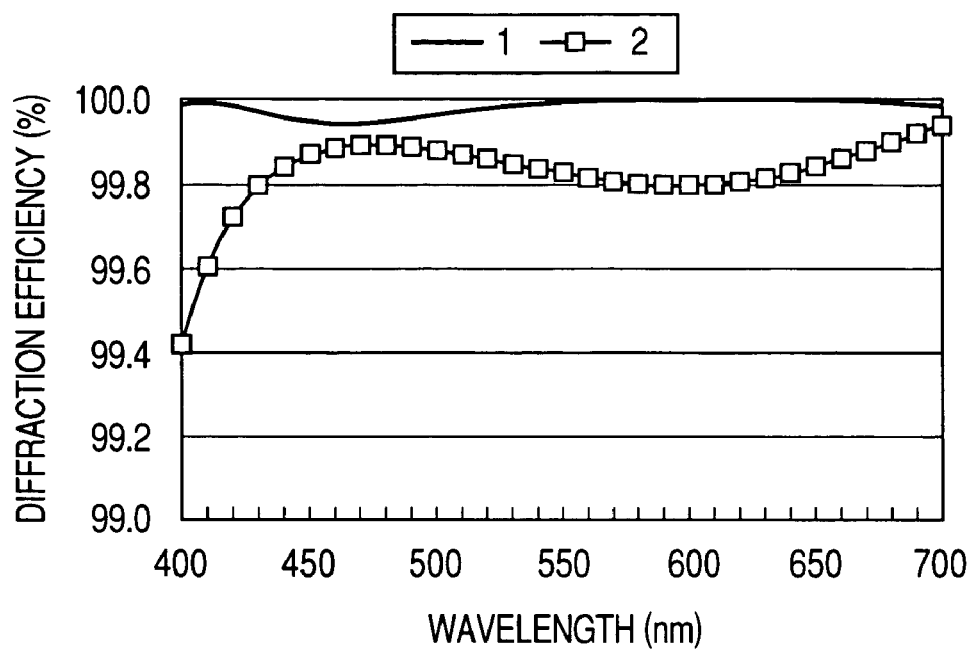
FIG. 11 is an explanatory diagram of diffraction efficiency on the design order in a case where a material that is different from the material according to the present invention is used in a third embodiment.

In FIG. 11, curve 1 represents the diffraction efficiency on the design order. It can be seen that a favorable characteristic of 99.9% or more is obtained in the entire visible wavelength range. Also, in FIG. 11, curve 2 indicates changing of the diffraction efficiency in the case where the refractive index changes due to a temperature change of 30° C. The deviation is increased to 0.6% at short wavelengths of 430 nm or less, but it is possible to suppress the deviation to 0.2% or less in almost the entire visible wavelength range. It can be understood from this fact that when the amount of the fine particles mixed into the resin is less than 25% in terms of the volume ratio, it becomes possible to obtain a construction of the laminated DOE where the deviation of the diffraction efficiency due to the environmental change is sufficiently suppressed.

A refractive index change dn/dt due to a temperature change of the fine particle dispersed resin where the fine particles are mixed at 20% is $-1.15 \times 10^{-4}/°$ C. It can be understood from this fact that when 80% or more of characteristics of a material agrees with those of another material, it is possible to consider that the two materials are substantially equal to each other.

More specifically, it is sufficient that the refractive index changes $dn1/dt$ and $dn2/dt$, the linear expansion coefficients $\alpha1$ and $\alpha2$, and the swelling ratios $\beta1$ and $\beta2$ satisfy the following conditional expressions, $$0.8 \leq dn1/dt/dn2/dt \leq 1.25 \qquad (19),$$

$$0.8 \leq \alpha1/\alpha2 \leq 1.25 \qquad (20),$$

$$0.8 \leq \beta1/\beta2 \leq 1.25 \qquad (21).$$

Fourth Embodiment

Next, an embodiment will be described in which consideration is given to an influence that moisture absorption by a material constituting a diffraction optical element exerts on diffraction efficiency.

The inventors of the present invention have found that, by selecting a material having a moisture absorption coefficient in a range of 70 to 100% of the largest water absorption coefficient of the materials as the material of each diffraction grating of the laminated DOE, it is possible to suppress the deviation of the diffraction efficiency due to the moisture absorption without sealing.

More specifically, by combining a certain material with a material where inorganic fine particles are mixed into the certain material at a volume ratio of 50% or more, it is possible to obtain a combination where optical characteristics of the materials are different from each other but water absorption coefficients of the materials are close to each other (in a range of 70 to 100% with respect to a material having the largest water absorption coefficient). It is preferable that the particle diameter of the mixed inorganic fine particles be set to 50 nm or less with regard to transparency.

Like the diffraction optical element 1 shown in FIG. 2 described in the first embodiment, the diffraction optical element in this embodiment is a diffraction optical element where a first element portion 2 and a third element portion 3 are close-arranged with an air layer 10 therebetween.

First, a material of a first diffraction grating 6 will be described. A ultraviolet curing precursor B1 is obtained by adding and mixing 3.5 g of an ultraviolet curing resin A1, in which tris (2-acroxyethyl)isocyanurate, pentaeryerythritoltriacrylate, cyclohexylacrylate, ARONIX M-6100 (Toagosei Co., Ltd.), and 2,2-dimethoxy-1,2-diphenylethane-1-one that is an initiator are mixed at a ratio of 10:10:10:10:1, and 1.0 g of DisperByk 182 (BYK-Chemie Japan KK) that is a dispersing agent into 50 g of a methylethylketone solution in which ITO fine particles having an average particle diameter of 10 nm are dispersed at 10 wt % (weight percent), and then removing methylethylketone by the decompression.

Figure 17A:
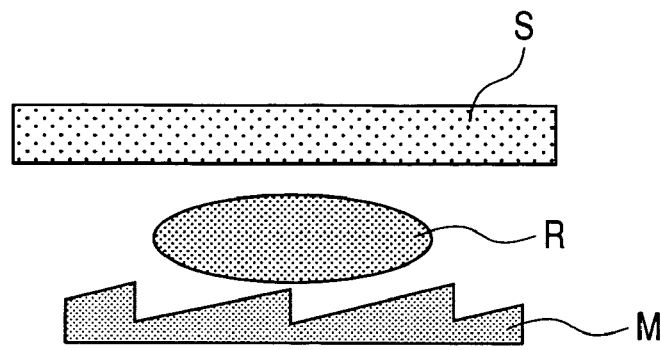
FIGS. 17A, 17B, and 17C are each an explanatory diagram of ultraviolet curing molding of a diffraction optical element.
Figure 17B:
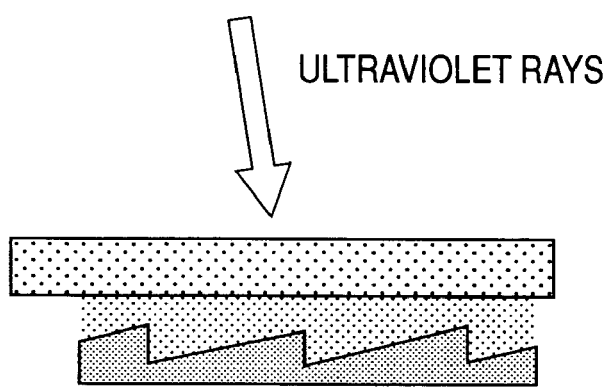
Figure 17C:
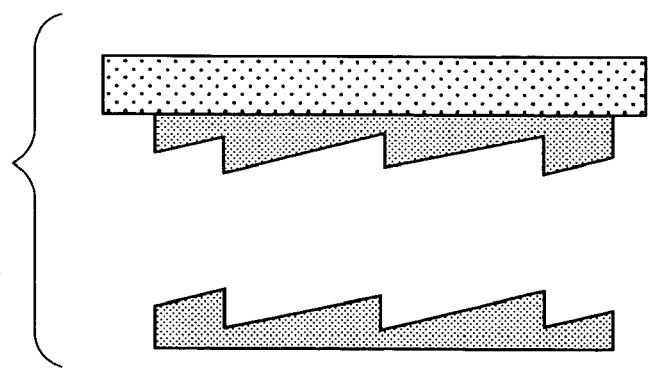

Then, the first element portion 2 is produced by placing the UV curing precursor B1 (R) on a mold M and pressing it using a flat plate (substrate S) made of glass (BK7) as shown in FIG. 17A, irradiating by means of a UV exposing machine (EX250 manufactured by HOYA-SCHOTT CORPORATION) at 20,000 mJ/cm$^2$ (100 mW/cm$^2$, 200 seconds) (FIG. 17B), and then releasing from the mold (FIG. 17C).

The optical characteristics of a cured matter of the UV curing precursor B1 produced under the same UV irradiation condition are nd=1.566, vd=23.0, θgF=0.44.

On the other hand, as a material of a second diffraction grating 7, an ultraviolet curing resin A1 having optical characteristics of nd=1.521, μd=50.4 is adopted. Like in the case of the first element portion 2, a diffraction element shape (second element portion 3) is produced by pouring the ultraviolet curing resin A1 onto a mold M and pressing it using glass (BK7) as shown in FIG. 17A, irradiating by means of a UV exposing machine (EX250 manufactured by HOYA-SCHOTT CORPORATION) at 3,000 mJ/cm$^2$, and then releasing from the mold.

Finally, the laminated DOE shown in FIG. 2 is produced by forming an antireflection film for each of the first element portion 2 and the second element portion 3 and then combining the element portions 2 and 3 with each other. The grating height d1 of the first diffraction grating 2 is 10.26 μm, the grating height d2 of the second diffraction grating 3 is 12.23 μm, the thickness D of the air layer is 1.5 μm, and the total thickness (d1+d2+D) of the diffraction portion is 24.0 μm. The diffraction pitch is set at a uniform pitch of 80 μm.

A film made of the cured matter of the UV curing precursor B1 and a film made of the cured matter of the ultraviolet curing resin A1 cured under such an irradiation condition are left alone in water at 25° C. for 24 hours and weight deviations are measured. The weight of the cured matter of the UV curing precursor B1 becomes 1.025 times as much as before, and the water absorption coefficient thereof is 2.5%. Also, the weight of the cured matter of the ultraviolet curing resin A1 becomes 1.03 times as much as before, and the water absorption coefficient thereof is 3.0%. A ratio between the water absorption coefficients is 83%.

Figure 18A:
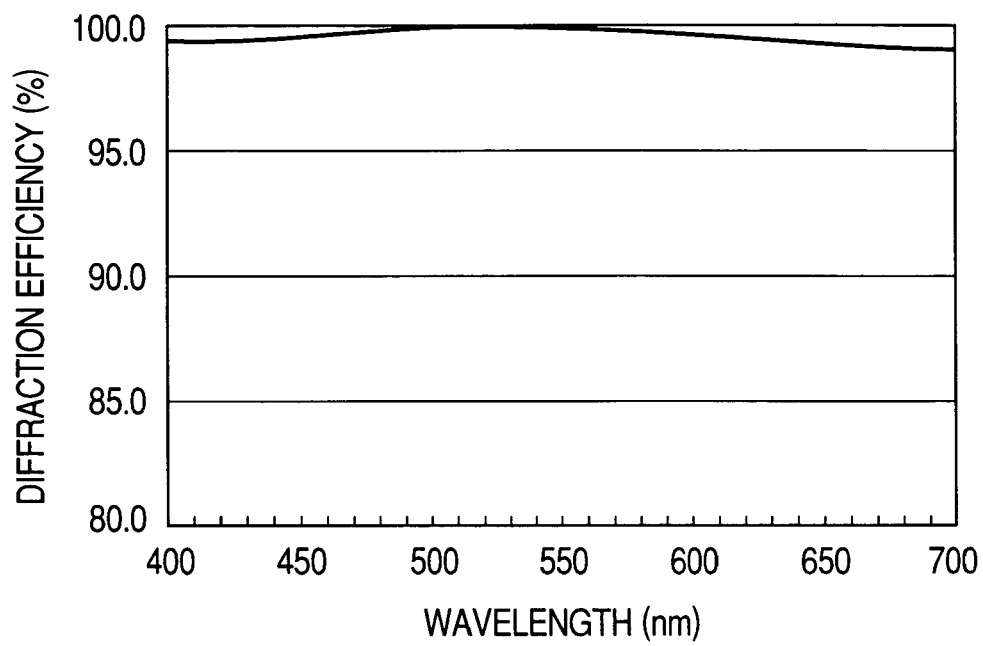
FIGS. 18A and 18B respectively show diffraction efficiency before moisture absorption and diffraction efficiency after moisture absorption of the diffraction optical element according to the fourth embodiment.
Figure 18B:
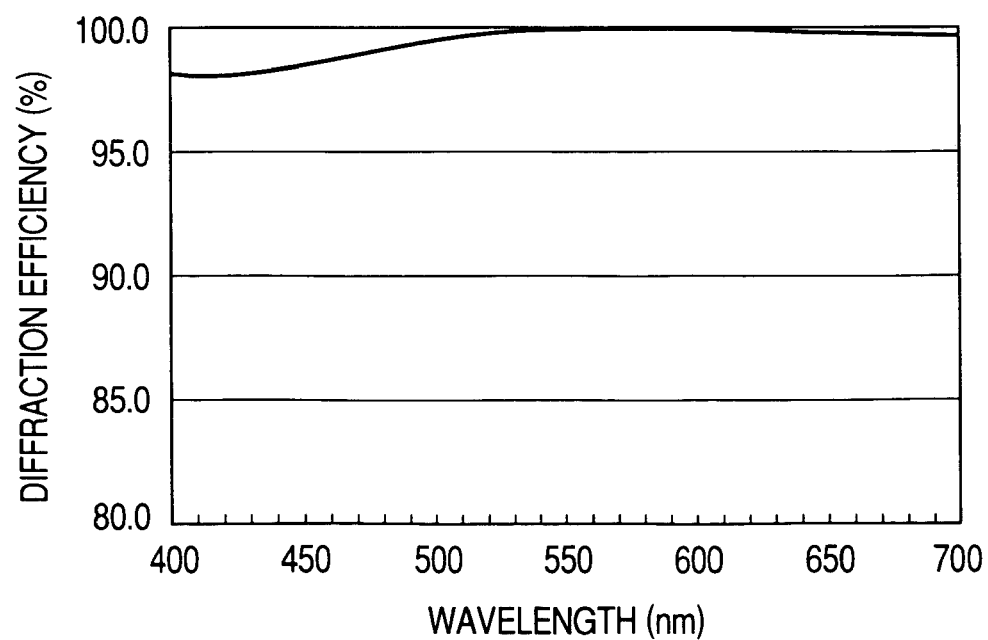

FIG. 18A shows diffraction efficiency as to diffraction light on the design order (+1st-order) at an incident angle of 0°. In a range of 400 to 700 nm, the diffraction efficiency is 99% or more and assumes a favorable value. FIG. 18B shows diffraction efficiency after leaving for 24 hours in an environment where the temperature is 30° C. and the humidity is 85%. It can be seen that in the range of 400 to 700 nm, the diffraction efficiency is 98% or more and assumes a favorable value.

FIRST COMPARATIVE EXAMPLE

As distinct from the fourth embodiment, instead of the ultraviolet curing resin A1, an ultraviolet curing resin A2 is used in which tris (2-acroxyethyl) isocyanurate, pentaeryerythritoltriacrylate, N-vinylcarbazole, ARONIX M-6100 (Toagosei Co., Ltd.), and 2,2-dimethoxy-1,2-diphenylethane-1-one that is an initiator are mixed at a ratio of 15:10:20:5:1. A UV curing precursor B2 is obtained by adding and mixing 3.5 g of the ultraviolet curing resin A2 and 1.0 g of DisperByk 182 that is a dispersing agent into 50 g of a xylene solution in which ITO fine particles having an average particle diameter of 10 nm are dispersed at 10 wt % (weight percent), and removing xylene by decompression.

Then, like in the fourth embodiment, a first element portion 2 is produced by placing the UV curing precursor B2 (R) on a mold M, pressing it using a flat plate (substrate S) made of glass (BK7), irradiating by means of a UV exposing machine (EX250 manufactured by HOYA-SCHOTT CORPORATION) at 20,000 $mJ/cm^2$ (100 $mW/cm^2$, 200 seconds), and releasing from the mold.

The optical characteristics of a cured matter of the UV curing precursor B2 produced under the same UV irradiation condition are nd=1.618, νd=16.8, θgF=0.48.

On the other hand, as a material of a second diffraction grating 7, an ultraviolet curing resin A1 having optical characteristics of nd=1.521, νd=50.4 is adopted. A method of producing a second element portion 3 is the same as that in the first embodiment, so the description thereof will be omitted.

Finally, the laminated DOE shown in FIG. 2 is produced by forming an antireflection film for each of the first element portion 2 and the second element portion 3 produced in the manner described above and then combining the element portions 2 and 3 with each other. The grating height d1 of the first diffraction grating 2 is 6.2 μm, the grating height d2 of the second diffraction grating 3 is 8.7 μm, the thickness D of the air layer is 1.5 μm, and the total thickness (d1+d2+D) of the diffraction portion is 16.4 μm. The diffraction pitch is set to a uniform pitch of 80 μm.

A film of the cured matter of the UV curing precursor B2 and a film of the cured matter of the ultraviolet curing resin A1 cured under such an irradiation condition are left alone in water at 25° C. for 24 hours and weight deviations are measured. The weight of the cured matter of the UV curing precursor B2 becomes 1.012 times as much as before, and the water absorption coefficient thereof is 1.2%. The weight of the cured matter of the ultraviolet curing resin A1 becomes 1.03 times as much as before, and the water absorption coefficient thereof is 3.0%. A ratio between the water absorption coefficients is 40%.

Figure 19A:
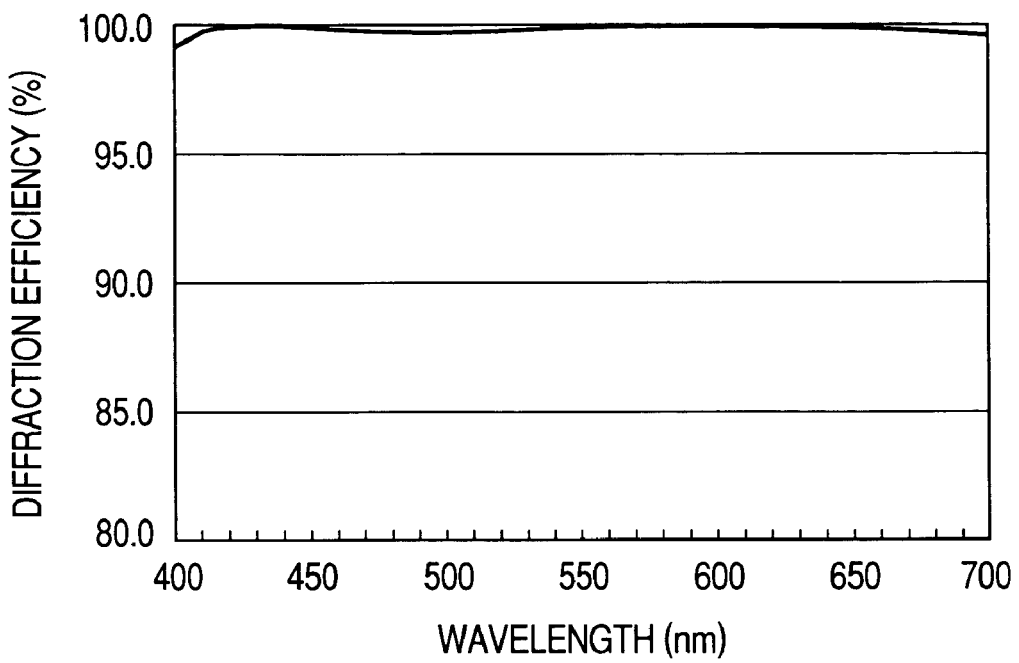
FIGS. 19A and 19B respectively show diffraction efficiency before moisture absorption and diffraction efficiency after moisture absorption of a diffraction optical element according to a first comparison example.
Figure 19B:
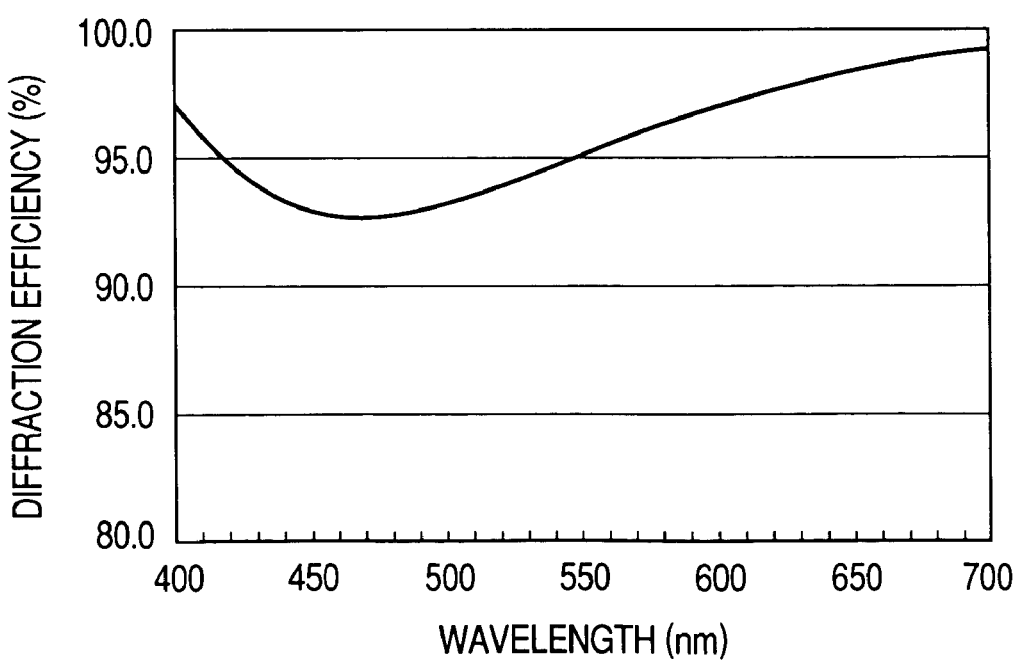

FIG. 19A shows diffraction efficiency as to diffraction light on the design order (+1st-order) at an incident angle of 0°. In a range of 400 to 700 nm, the diffraction efficiency is 99% or more and assumes a favorable value. FIG. 19B shows diffraction efficiency after leaving for 24 hours in an environment where the temperature is 30° C. and the humidity is 85%. When the diffraction gratings of the laminated DOE are produced using materials whose water absorption coefficients are significantly different from each other in the manner described above, diffraction efficiency of around 92% is obtained in the range of 400 to 700 nm and a falloff of the diffraction efficiency due to moisture absorption is observed.

Fifth Embodiment

Like the fourth embodiment, a fifth embodiment is also an embodiment where consideration is given to an influence that moisture absorption by materials exerts on diffraction efficiency. A diffraction optical element in this embodiment is also the diffraction optical element shown in FIG. 2 where the first element portion 2 and the third element portion 3 are close-arranged with the air layer 10 therebetween.

A UV curing precursor B3 is obtained by adding 3.5 g of an ultraviolet curing resin A1, in which tris (2-acroxyethyl) isocyanurate, pentaeryerythritoltriacrylate, cyclohexylacrylate, ARONIX M-6100 (Toagosei Co., Ltd.), and 2,2-dimethoxy-1,2-diphenylethane-1-one that is an initiator are mixed at a ratio of 10:10:10:10:1, and 1.0 g of DisperByk 182 that is a dispersing agent into 45 g of a methylethylketone solution, in which $TiO_2$ fine particles having an average particle diameter of 10 nm are dispersed at 10 wt %, and then removing methylethylketone by decompression.

Then, the first element portion 2 is produced by placing the UV curing precursor B3 (R) on a mold M and pressing it using a flat plate (substrate S) made of glass (BK7) (FIG. 17A), irradiating by means of a UV exposing machine (EX250 manufactured by HOYA-SCHOTT CORPORATION) at 20,000 $mJ/cm^2$ (100 $mW/cm^2$, 200 seconds) (FIG. 17B), and releasing from the mold (FIG. 17C).

The optical characteristics of a cured matter of the UV curing precursor B3 produced under the same UV irradiation condition are nd=1.694, νd=19.9, θgF=0.63.

On the other hand, as a material of the second diffraction grating, an ultraviolet curing resin A1 having optical characteristics of nd=1.521, νd=50.4 is adopted. A method of producing the second element portion 3 is the same as that in the first embodiment, so the description thereof will be omitted.

Finally, the laminated DOE shown in FIG. 2 is produced by forming an antireflection film for each of the first element portion 2 and the second element portion 3 produced in the manner described above and then combining the element portions 2 and 3 with each other. The grating height d1 of the first diffraction grating 2 is 5.5 μm, the grating height d2 of the second diffraction grating 3 is 8.6 μm, the thickness D of the air layer is 1.5 μm, and the total thickness (d1+d2+D) of the diffraction portion is 15.6 μm. The diffraction pitch is set at a uniform pitch of 80 μm.

A film of the cured matter of the UV curing precursor B3 and a film of the cured matter of the ultraviolet curing resin A1 cured under such an irradiation condition are left alone in water at 25° C. for 24 hours and weight deviations are measured. The weight of the cured matter of the UV curing precursor B3 becomes 1.026 times as much as before, and the water absorption coefficient thereof is 2.6%. The weight of the cured matter of the ultraviolet curing resin A1 becomes 1.03 times as much as before, and the water absorption coefficient thereof is 3.0%. A ratio between the water absorption coefficients is 87%.

Figure 20A:
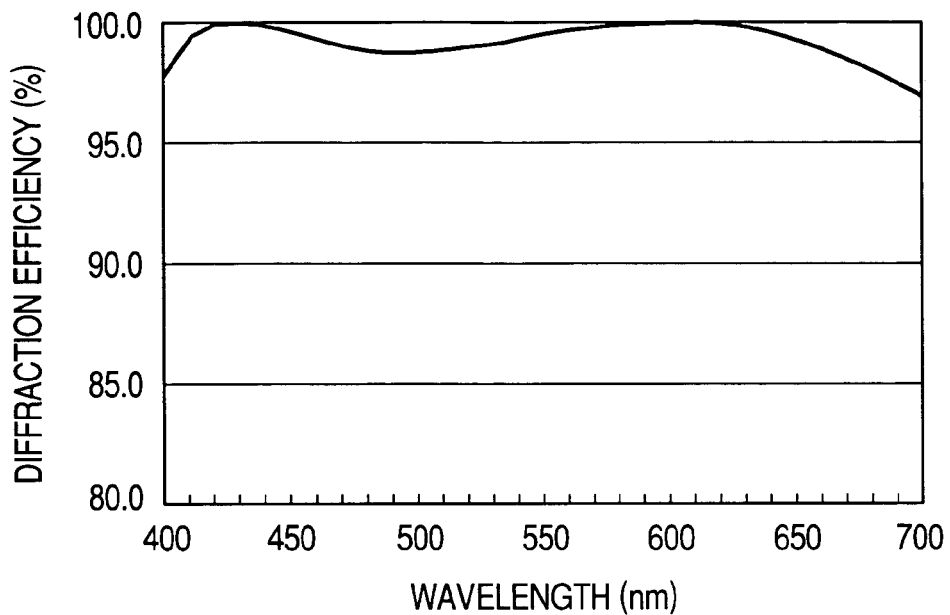
FIGS. 20A and 20B respectively show diffraction efficiency before moisture absorption and diffraction efficiency after moisture absorption of a diffraction optical element according to the fifth embodiment.
Figure 20B:
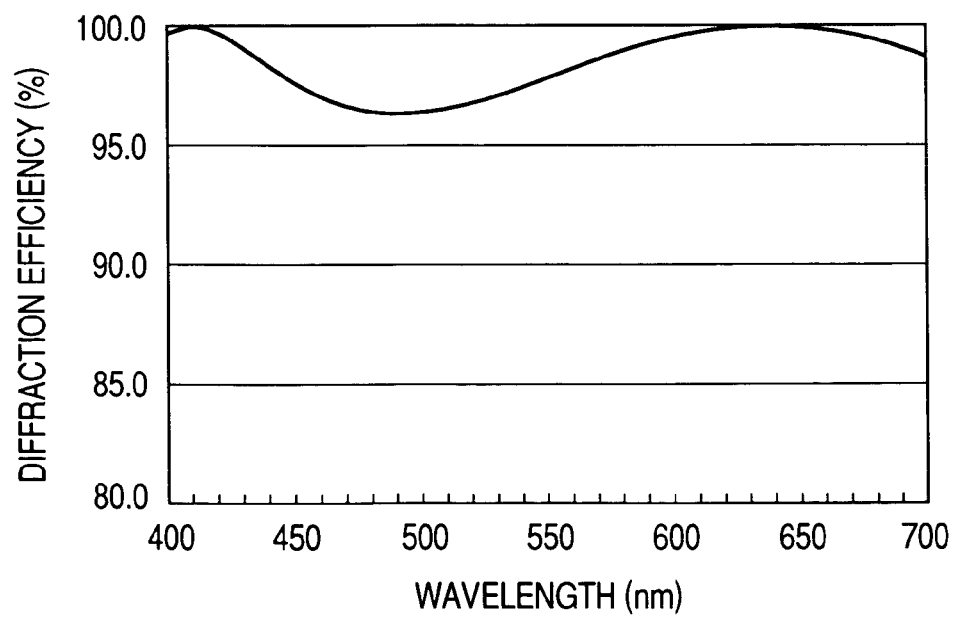

FIG. 20A shows diffraction efficiency as to diffraction light on the design order (+1st-order) at an incident angle of 0°. In a range of 400 to 700 nm, the diffraction efficiency is 96.8% or more and assumes a favorable value. FIG. 20B shows diffraction efficiency after leaving for 24 hours in an environment where the temperature is 30° C. and the humidity is 85%. It can be seen that in the range of 400 to 700 nm, the diffraction efficiency is 96% or more and assumes a favorable value.

SECOND COMPARATIVE EXAMPLE

As distinct from the fifth embodiment, instead of the UV curing precursor B3, an ultraviolet curing resin A3 is adopted in which N-vinylcarbazole, polyvinyl carbazole, adipic acid divinyl, and 2,2-dimethoxy-1,2-diphenylethane-1-one that is an initiator are mixed at a ratio of 90:10:15:2.

Then, the first element portion 2 is produced by placing the ultraviolet curing resin A3 (R) on a mold M and pressing it using a flat plate (substrate S) made of glass (BK7) (FIG. 17A), irradiating by means of a UV exposing machine (EX250 manufactured by HOYA-SCHOTT CORPORATION) at 20,000 mJ/cm$^2$ (100 mW/cm$^2$, 200 seconds) (FIG. 17B), and releasing from the mold (FIG. 17C).

The optical characteristics of a cured matter of the ultraviolet curing resin A3 produced under the same UV irradiation condition are nd=1.677, vd=18.2, θgF=0.66.

On the other hand, as a material of the second diffraction grating 7, an ultraviolet curing resin A1 having optical characteristics of nd=1.521, vd=50.4 is adopted. A method of producing the second element portion 3 is the same as that in the first embodiment, so the description thereof will be omitted.

Finally, the laminated DOE shown in FIG. 2 is produced by forming an antireflection film for each of the first element portion 2 and the second element portion 3 produced in the manner described above and then combining the element portions 2 and 3 with each other. The grating height d1 of the first diffraction grating 2 is 4.6 µm, the grating height d2 of the second diffraction grating 3 is 7.2 µm, the thickness D of the air layer is 1.5 µm, and the total thickness (d1+d2+D) of the diffraction portion is 13.3 µm. The diffraction pitch is set at a uniform pitch of 80 µm.

A film of the cured matter of the UV curing precursor B3 and a film of the cured matter of the ultraviolet curing resin A1 cured under such an irradiation condition are left alone in water at 25° C. for 24 hours and weight deviations are measured. The weight of the cured matter of the ultraviolet curing resin A3 becomes 1.005 times as much as before, and the water absorption coefficient thereof is 0.7%. The weight of the cured matter of the ultraviolet curing resin A1 becomes 1.03 times as much as before, and the water absorption coefficient thereof is 3.0%. A ratio between the water absorption coefficients is 23%.

Figure 21A:
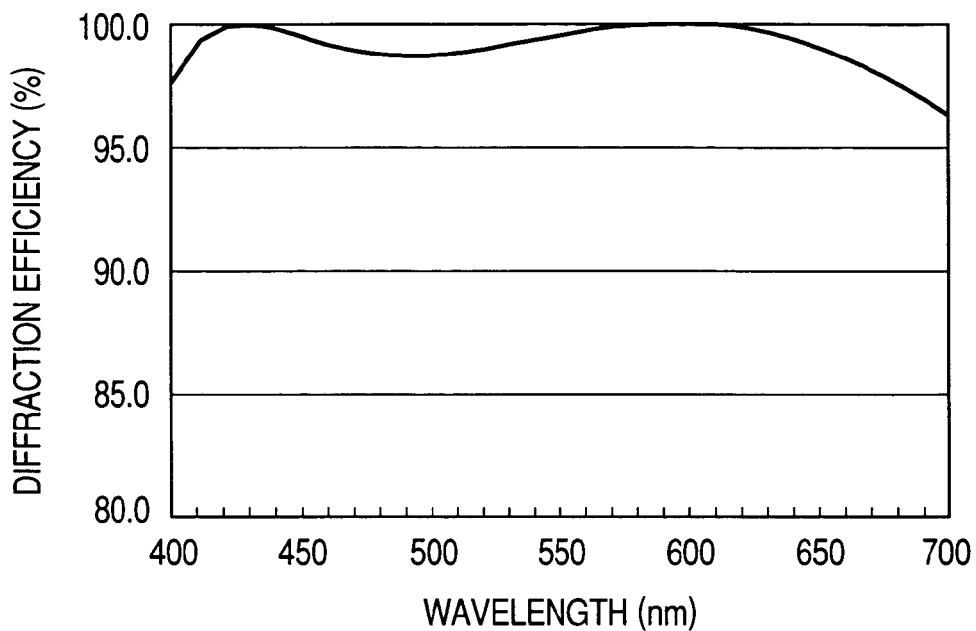
FIGS. 21A and 21B respectively show diffraction efficiency before moisture absorption and diffraction efficiency after moisture absorption of a diffraction optical element according to a second comparison example.
Figure 21B:
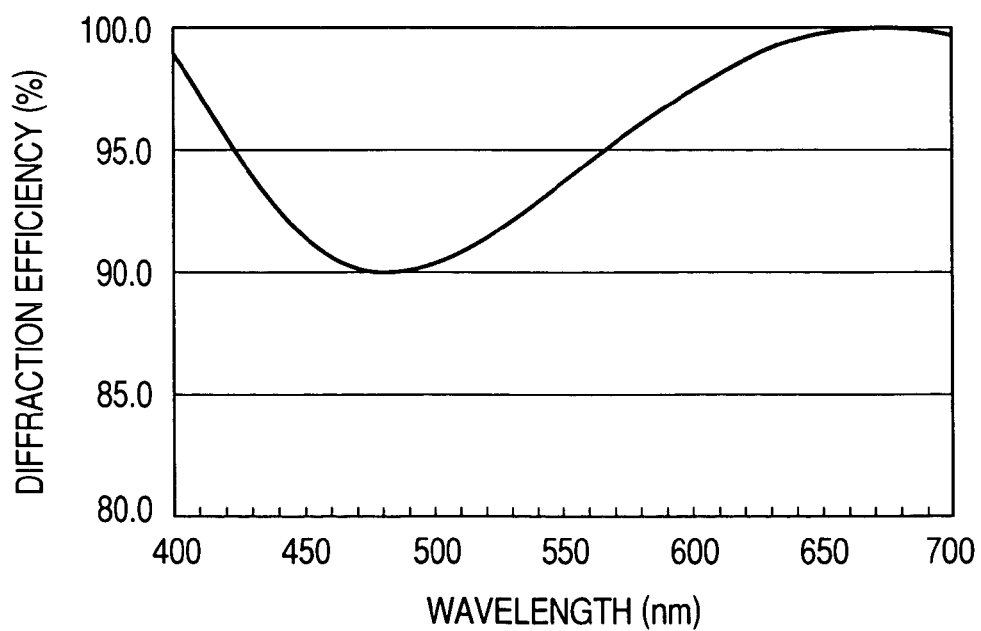

FIG. 21A shows diffraction efficiency as to diffraction light on the design order (+1st-order) at an incident angle of 0°. In a range of 400 to 700 nm, the diffraction efficiency is 96% or more and assumes a favorable value. FIG. 21B shows diffraction efficiency after leaving for 24 hours in an environment where the temperature is 30° C. and the humidity is 85%. When the diffraction gratings of the laminated DOE are produced using materials whose water absorption coefficients are significantly different from each other in the manner described above, diffraction efficiency of around 90% is obtained in the range of 400 to 700 nm and a significant change occurs to the diffraction efficiency due to moisture absorption.

Sixth Embodiment

A sixth embodiment is also an embodiment where consideration is given to an influence that moisture absorption by materials exerts on diffraction efficiency. A diffraction optical element in this embodiment is also the diffraction optical element shown in. FIG. 2 where the first element portion 2 and the third element portion 3 are close-arranged with the air layer 10 therebetween.

A UV curing precursor B4 is obtained by adding 3.5 g of an ultraviolet curing resin A4, in which tris (2-acroxyethyl) isocyanurate, pentaeryerythritoltriacrylate, dicyclopenthenyloxyethylacrylate, polyesteracrylate (ARONIX M-6200 (Toagosei Co., Ltd.)), and 2-benzyl-2-dimethylamino-1-(4-morpholinophenylbutanone-1) that is an initiator are mixed at a ratio of 10:10:10:10:1, and 1.0 g of DisperByk 182 that is a dispersing agent into 45 g of a methylethylketone solution in which TiO$_2$ fine particles having an average particle diameter of 10 nm are dispersed at 10 wt %, and removing methylethylketone by decompression.

Then, the first element portion 2 is produced by placing the UV curing precursor B4 (R) on a mold M and pressing it using a flat plate (substrate S) made of glass (BK7) (FIG. 17A), irradiating by means of a UV exposing machine (EX250 manufactured by HOYA-SCHOTT CORPORATION) at 20,000 mJ/cm2 (100 mW/cm$^2$, 200 seconds) (FIG. 17B), and releasing from the mold (FIG. 17C).

The optical characteristics of a cured matter of the UV curing precursor B4 produced under the same UV irradiation condition are nd=1.702, vd=20.2, θgF=0.63.

On the other hand, as a material of the second diffraction grating, an ultraviolet curing resin A4 having optical characteristics of nd=1.523, vd=52.4 is adopted. The second element portion 3 is produced by pouring the ultraviolet curing resin A4 into a mold M and pressing it using glass (BK7) (FIG. 17A), irradiating by means of a UV exposing machine (EX250 manufactured by HOYA-SCHOTT CORPORATION) at 3,000 mJ/cm$^2$ (FIG. 17B), and releasing from the mold (FIG. 17C).

Finally, the laminated DOE shown in FIG. 2 is produced by forming an antireflection film for each of the first element portion 2 and the second element portion 3 produced in the manner described above and then combining the element portions 2 and 3 with each other. The grating height d1 of the first diffraction grating 2 is 5.5 µm, the grating height d2 of the second diffraction grating 3 is 8.4 µm, the thickness D of the air layer is 1.5 µm, and the total thickness (d1+d2+D) of the diffraction portion is 15.4 µm. The diffraction pitch is set to a uniform pitch of 80 µm.

A film of the cured matter of the UV curing precursor B4 and a film of the cured matter of the ultraviolet curing resin A4 cured under such an irradiation condition are left alone in water at 25° C. for 24 hours and weight deviations are measured. The weight of the cured matter of the UV curing precursor B4 becomes 1.025 times as much as before, and the water absorption coefficient thereof is 2.5%. The weight of the cured matter of the ultraviolet curing resin A4 becomes 1.029 times as much as before, and the water absorption coefficient thereof is 2.9%. A ratio between the water absorption coefficients is 86%.

Figure 22A:
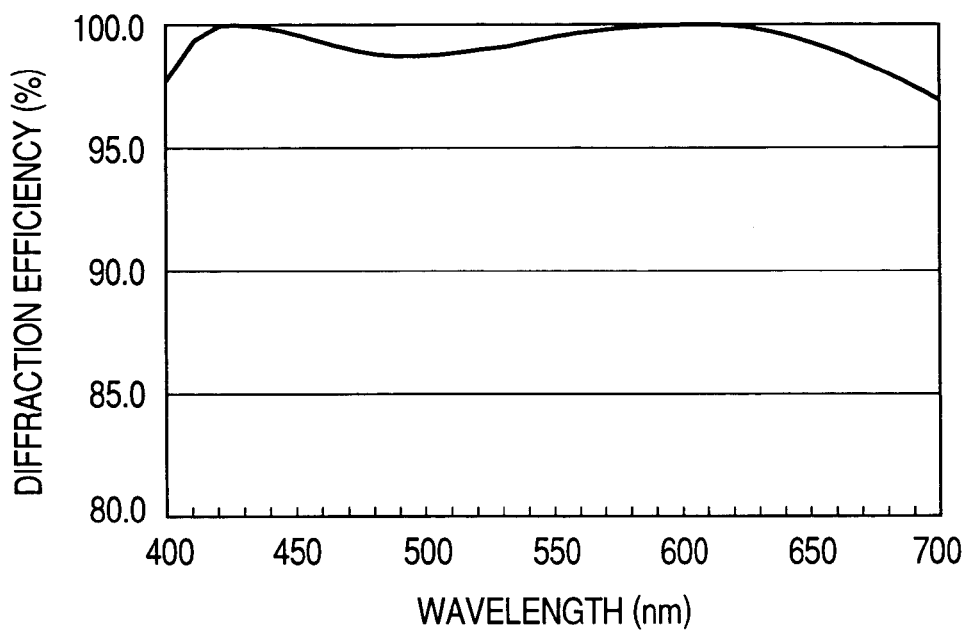
FIGS. 22A and 22B respectively show diffraction efficiency before moisture absorption and diffraction efficiency after moisture absorption of a diffraction optical element according to a sixth embodiment.
Figure 22B:
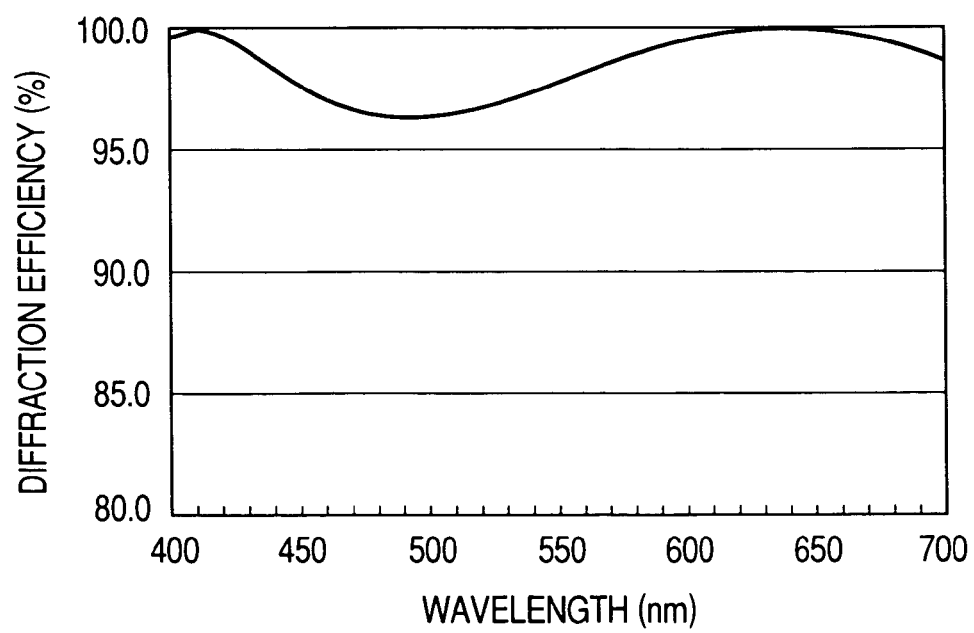

FIG. 22A shows diffraction efficiency as to diffraction light on the design order (+1st-order) at an incident angle of 0°. In a range of 400 to 700 nm, the diffraction efficiency is 96.8% or more and assumes a favorable value. FIG. 22B shows diffraction efficiency after leaving for 24 hours in an environment where the temperature is 30° C. and the humidity is 85%. In the range of 400 to 700 nm, the diffraction efficiency is 96% or more and assumes a favorable value.

Seventh Embodiment

A seventh embodiment is also an embodiment where consideration is given to an influence that moisture absorption by materials exerts on diffraction efficiency. A diffraction optical element in this embodiment is also the diffraction optical element shown in FIG. 2 where the first element portion 2 and the third element portion 3 are close-arranged with the air layer 10 therebetween.

A UV curing precursor B5 is obtained by adding 3.5 g of an ultraviolet curing resin A5, in which tris (2-acroxyethyl) isocyanurate, pentaeryerythritoltriacrylate, cyclohexylacrylate, ARONIX M-6100 (Toagosei Co., Ltd.), and 2,2-dimethoxy-1,2-diphenylethane-1-one that is an initiator are mixed at a ratio of 10:10:15:5:1, and 1.0 g of DisperByk 182 that is a dispersing agent into 45 g of a methylethylketone solution in which $TiO_2$ fine particles having an average particle diameter of 10 nm are dispersed at 10 wt %, and removing methylethylketone be decompression.

Then, the first element portion 2 is produced by placing the UV curing precursor B5 (R) on a mold M and pressing it using a flat plate (substrate S) made of glass (BK7) (FIG. 17A), irradiating by means of a UV exposing machine (EX250 manufactured by HOYA-SCHOTT CORPORATION) at 20,000 $mJ/cm^2$ (100 $mW/cm^2$, 200 seconds) (FIG. 17B), and releasing from the mold (FIG. 17C).

The optical characteristics of a cured matter of the UV curing precursor B5 produced under the same UV irradiation condition are nd=1.701, vd=20.1, $\theta gF$=0.63.

On the other hand, as a material of the second diffraction grating, an ultraviolet curing resin A6 is adopted in which pentaerythritol tetra-acrylate, pentaeryerythritoltriacrylate, tricyclodecanedimethanolacrylate, cyclohexylacrylate, ARONIX M-6100 (Toagosei Co., Ltd.), and 2-methyl-1 (4-methylthio) phenyl-2-morpholinopropane-1-one that is an initiator are mixed at a ratio of 10:10:5:10:5:1. The second element portion 3 is produced by pouring the ultraviolet curing resin A6 (R) into a mold M and pressing it using a flat plate (substrate S) made of glass (BK7) (FIG. 17A), irradiating by means of a UV exposing machine (EX250 manufactured by HOYA-SCHOTT CORPORATION) for 3,000 $mJ/cm^2$ (FIG. 17B), and releasing from the mold (FIG. 17C).

The optical characteristics of a cured matter of the ultraviolet curing resin A6 produced under the same UV irradiation condition are nd=1.522, vd=50.5.

Finally, the laminated DOE shown in FIG. 2 is produced by forming an antireflection film for each of the first element portion 2 and the second element portion 3 produced in the manner described above and then combining the element portions 2 and 3 with each other. The grating height d1 of the first diffraction grating 2 is 5.5 μm, the grating height d2 of the second diffraction grating 3 is 8.5 μm, the thickness D of the air layer is 1.5 μm, and the total thickness (d1+D+d2) of the diffraction portion is 15.5 μm. The diffraction pitch is set at a uniform pitch of 80 μm.

A film of the cured matter of the UV curing precursor B5 and a film of the cured matter of the ultraviolet curing resin A6 cured under such an irradiation condition are left alone in water at 25° C. for 24 hours and weight deviations are measured. The weight of the cured matter of the UV curing precursor B5 becomes 1.025 times as much as before, and the water absorption coefficient thereof is 2.5%. The weight of the cured matter of the ultraviolet curing resin A6 becomes 1.029 times as much as before, and the water absorption coefficient thereof is 2.9%. A ratio between the water absorption coefficients is 86%.

Figure 23A:
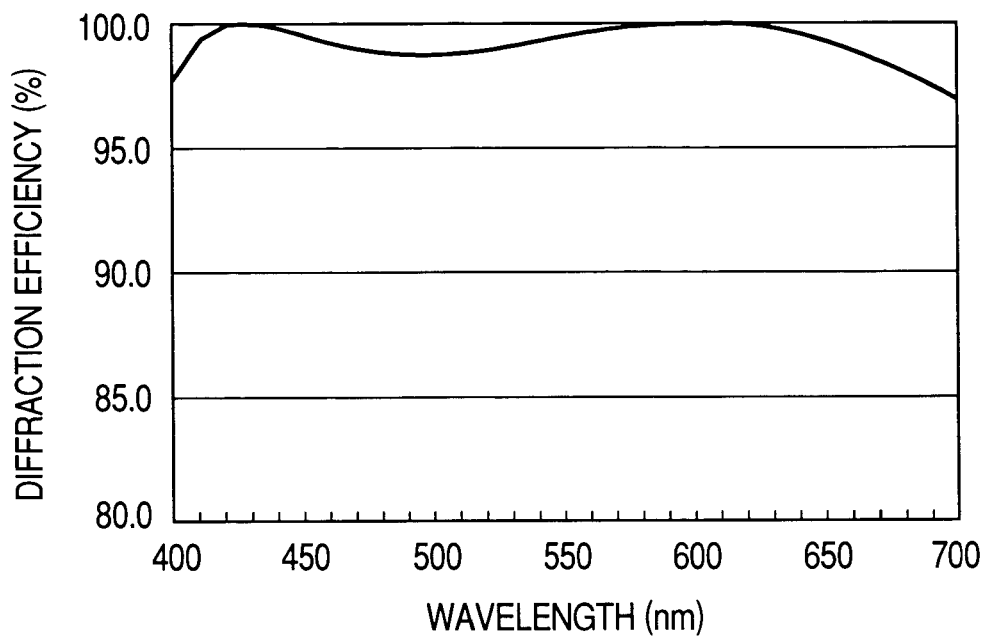
FIGS. 23A and 23B respectively show diffraction efficiency before moisture absorption and diffraction efficiency after moisture absorption of a diffraction optical element according to a seventh embodiment.
Figure 23B:
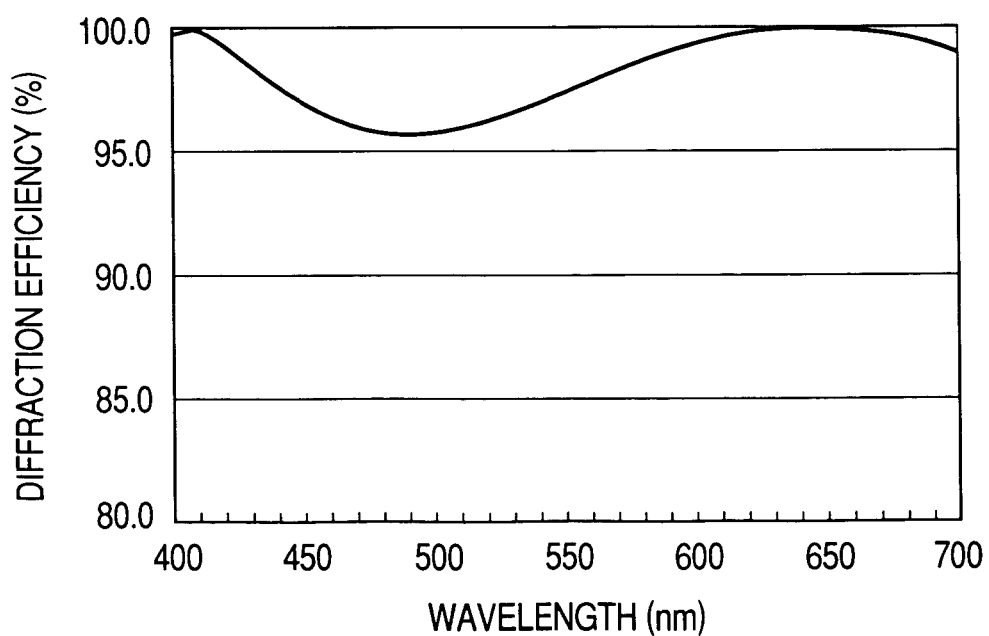

FIG. 23A shows diffraction efficiency as to diffraction light on the design order (+1st-order) at an incident angle of 0°. In a range of 400 to 700 nm, the diffraction efficiency is 96.8% or more and assumes a favorable value. FIG. 23B shows diffraction efficiency after leaving for 24 hours in an environment where the temperature is 30° C. and the humidity is 85%. In the range of 400 to 700 nm, the diffraction efficiency is 96% or more and assumes a favorable value.

Eighth Embodiment

Figure 12:
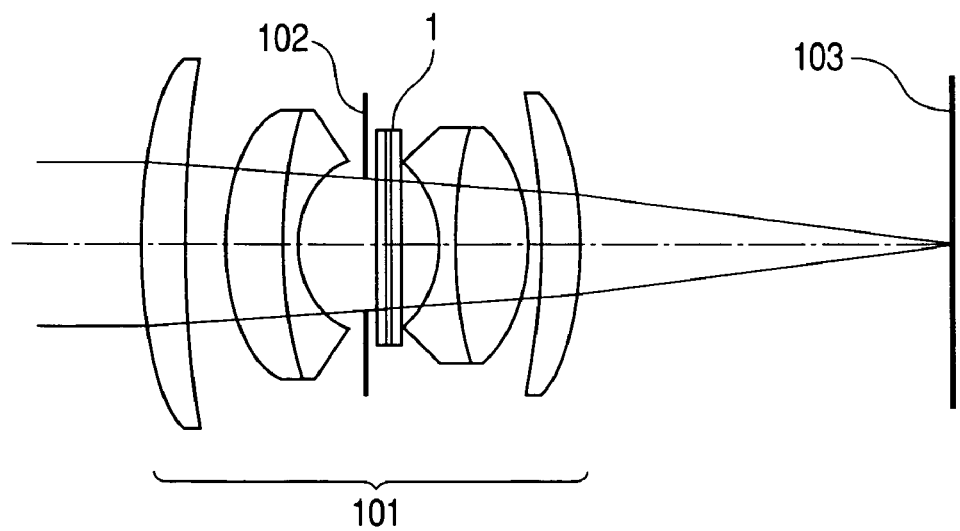
FIG. 12 is a schematic diagram of a photographing optical system according to a fourth embodiment.

An embodiment of an optical system using the diffraction optical element according to the present invention is shown in FIG. 12. FIG. 12 is a cross-sectional view of an image taking optical system used in a digital camera, a video camera, or the like. In FIG. 12, reference numeral 101 denotes an image taking lens mainly composed of a refractive lens (refractive optical element) and includes an aperture stop 102 and the diffraction optical element 1 according to the present invention described above. Reference numeral 103 is an imaging plane on which a film or a CCD is to be arranged. The diffraction optical element 1 is an element having a lens function and corrects chromatic aberrations of the image taking lens 101.

In the image taking lens shown in FIG. 12, the diffraction efficiency characteristic of the diffraction optical element 1 is significantly improved initially and also at the time environmental conditions change. Therefore, in various usage environments, flare light is suppressed, high resolving power is realized even at a low frequency, and high optical performance is achieved. It is possible to produce the diffraction optical element 1 even by a simple manufacturing method such as manufacturing the diffraction optical elements having an air layer as shown in FIG. 2, then bonding the diffraction optical elements together in their peripheral portions. In this case, it becomes possible to provide an inexpensive lens having high mass-productivity as the image taking lens.

In FIG. 12, the diffraction optical element 1 where a flat plate glass surface is set as a substrate is provided in proximity to the aperture stop 102, but the present invention is not limited to this. That is, as described above, the substrate may be set as a lens and the diffraction optical element 1 may be provided on a convex or concave surface of the lens. In addition, multiple diffraction optical elements according to the present invention may be used in the image taking lens.

Also, in this embodiment, a case has been described in which the diffraction optical element according to the present invention is applied to the photographing lens of a camera, but the present invention is not limited to this. That is, the same effects are provided even when the diffraction optical element according to the present invention is applied to an imaging optical system used in a wide wavelength range such as an image taking lens of a video camera, an image scanner of a business machine, or a reader lens of a digital copying machine.

Ninth Embodiment

Figure 13:
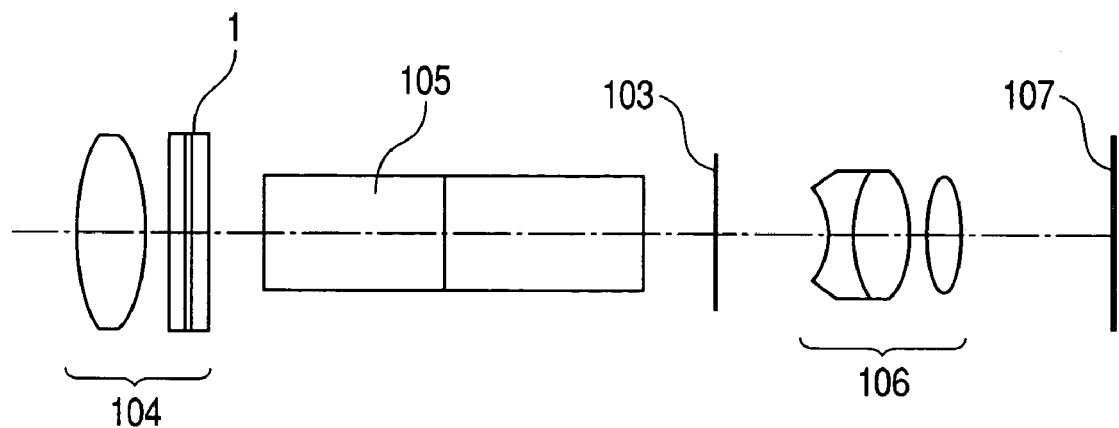
FIG. 13 is a schematic diagram of an observation optical system according to a fifth embodiment.

Another embodiment of the optical system using the diffraction optical element according to the present invention is shown in FIG. 13. FIG. 13 is a cross-sectional view of an observation optical system of a telescope, a binocular, or the like. In FIG. 13, reference numeral 104 denotes an object lens, numeral 105 an image reversing prism for reversing an image, numeral 106 an eyepiece, and numeral 107 an evaluation plane (pupil plane). Also, reference numeral 1 indicates the diffraction optical element according to the present invention described above. The diffraction optical element 1 is provided in order to correct chromatic aberrations and the like at an imaging surface 103 of the object lens 104.

In the observation optical system shown in FIG. 13, the diffraction efficiency characteristic of the diffraction optical element 1 is significantly improved initially and also at the time environmental conditions change. Therefore, in various usage environments, flare light is suppressed, high resolving power is realized at a low frequency, and high optical performance is achieved. It is possible to produce the diffraction optical element 1 even by a simple manufacturing method such as manufacturing the optical elements having an air layer as shown in FIG. 2, then bonding the diffraction optical element together in their peripheral portions. In this case, it becomes possible to provide an inexpensive optical system having high mass-productivity as the observation optical system (object lens portion thereof).

In FIG. 13, the diffraction optical element 1 where a flat plate glass is set as a substrate is provided, but the present invention is not limited to this. That is, as described above, in the diffraction optical element 1, the substrate may be set as a lens and the diffraction grating may be provided on the convex or concave surface of the lens. In addition, multiple diffraction optical elements according to the present invention may be used.

Also, in the observation optical system shown in FIG. 13, the diffraction optical element 1 according to the present invention is provided for the object lens 104, but the present invention is not limited to this. That is, the diffraction optical element according to the present invention may be provided on a surface of the prism 105 or in the eyepiece 106. Even in this case, the same effects can be provided. When the diffraction optical element 1 is provided on an object side with respect to the imaging surface 103, the chromatic aberration reduction effect is achieved only in the object lens portion, so in the case of an unaided eye observation system, it is preferable that the diffraction optical element 1 be provided at least for the object lens 104.

Also, in this embodiment, the diffraction optical element according to the present invention is applied to a binocular, but the present invention is not limited to this. That is, the same effects are provided even when the diffraction optical element according to the present invention is applied to an observation optical system of a terrestrial telescope, a telescope for astronomical observation, or the like. Also, the same effects are provided even when the diffraction optical element according to the present invention is applied to an optical finder of a lens-shutter camera, a video camera, or the like.

This application claims priorities form Japanese Patent Application Nos. 2004-134575 filed on Apr. 28, 2004 and 2005-121169 filed on Apr. 19, 2005, which are hereby incorporated by reference herein.

What is claimed is:

1. A diffraction optical element comprising:
a first diffraction grating made of a resin material in which inorganic fine particles are dispersed; and
a second diffraction grating made of a material whose organic matter composition is substantially the same as the organic matter composition of the resin material, the resin material in which inorganic fine particles are dispersed and the material whose organic matter composition is substantially the same as the organic matter composition of the resin material being substantially equal to each other in at least one of refractive index change due to temperature change, linear expansion coefficient, swelling ratio and water absorption coefficient,
wherein a maximum difference of optical path lengths of light passing through the diffraction optical element is integer multiples of a plurality of wavelengths.

2. A diffraction optical element according to claim 1, wherein a grating height changing direction of an arbitrary grating portion of the first diffraction grating and a grating height changing direction of a corresponding arbitrary grating portion of the second diffraction grating are opposite to each other.

3. A diffraction optical element according to claim 1, wherein the inorganic fine particles are made of a material whose Abbe constant is 15 or less.

4. A diffraction optical element according to claim 1, wherein an Abbe constant of the resin material, in which the inorganic fine particles are dispersed, is 30 or less.

5. A diffraction optical element according to claim 1, wherein the resin material in which the inorganic fine particles are dispersed contains the inorganic fine particles at a volume ratio of 5% or more and less than 25%.

6. A diffraction optical element according to claim 1, wherein an Abbe constant of the material, whose organic matter composition is substantially same as the organic matter composition of the resin material, is 40 or more.

7. An optical system comprising:
the diffraction optical element according to claim 1; and
a refractive optical element.

8. A diffraction optical element comprising:
a first diffraction grating made of a first material that is a resin material in which inorganic fine particles are dispersed; and
a second diffraction grating made of a second material having an optical characteristic different from that of the resin material in which the inorganic fine particles are dispersed,
wherein a maximum difference of optical path lengths of light passing through the diffraction optical element is integer multiples of a plurality of wavelengths, and
wherein each of the first material and the second material satisfies at least one of the following conditions:

$$0.8 \leq dn1/dt/dn2/dt \leq 1.25,$$

$$0.8 \leq \alpha1/\alpha2 < 1.25,$$

$$0.8 \leq \beta1/\beta2 < 1.25,$$

where $dn1/dt$ and $dn2/dt$ are respectively refractive index changes with respect to a temperature deviation of the first material and the second material, $\alpha1$ and $\alpha2$ are respectively linear expansion coefficients of the first material and the second material, and $\beta1$ and $\beta2$ are respectively swelling ratios of the first material and the second material.

9. A diffraction optical element according to claim 8, wherein a grating height changing direction of an arbitrary grating portion of the first diffraction grating and a grating height changing direction of a corresponding arbitrary grating portion of the second diffraction grating are opposite to each other.

10. A diffraction optical element according to claim 8, wherein the inorganic fine particles are made of a material whose Abbe constant is 15 or less.

11. A diffraction optical element according to claim 8, wherein an Abbe constant of the first material is 30 or less.

12. A diffraction optical element according to claim 8, wherein the first material contains the inorganic fine particles at a volume ratio of 5% or more and less than 25%.

13. A diffraction optical element according to claim 8, wherein an Abbe constant of the second material is 40 or more.

14. An optical system comprising:
a diffraction optical element according to claim 8; and
a refractive optical element.

15. A diffraction optical element comprising:
a first diffraction grating made of a resin material in which inorganic fine particles are dispersed; and
a second diffraction grating made of a material whose organic matter composition is substantially the same as the organic matter composition of the resin material, the smaller one of water absorption coefficients of the resin material in which the inorganic fine particles are dispersed, and the material whose organic matter composition is substantially the same as the organic matter composition of the resin material, is in a range of 70% to 100% of the greater one of the water absorption coefficients,
wherein a maximum difference of optical path lengths of light passing through the diffraction optical element is integer multiples of a plurality of wavelengths.

16. A diffraction optical element according to claim 15, wherein a grating height changing direction of an arbitrary grating portion of the first diffraction grating and a grating height changing direction of a corresponding arbitrary grating portion of the second diffraction grating are opposite to each other.

17. A diffraction optical element according to claim 15, wherein the inorganic fine particles are made of a material whose Abbe constant is 15 or less.

18. A diffraction optical element according to claim 15, wherein an Abbe constant of the resin material, in which the inorganic fine particles are dispersed, is 30 or less.

19. A diffraction optical element according to claim 15, wherein the resin material in which the inorganic fine particles are dispersed contains the inorganic fine particles at a volume ratio of 5% or more and less than 25%.

20. A diffraction optical element according to claim 15, wherein an Abbe constant of the material, whose organic matter composition is substantially same as the organic matter composition of the resin material, is 40 or more.

21. An optical system comprising:
the diffraction optical element according to claim 15; and
a refractive optical element.

* * * * *

UNITED STATES PATENT AND TRADEMARK OFFICE
CERTIFICATE OF CORRECTION

PATENT NO.         : 7,236,302 B2                                                Page 1 of 1
APPLICATION NO. : 11/116083
DATED              : June 26, 2007
INVENTOR(S)        : Takehiko Nakai, Hideo Ukuda and Masaaki Nakabayashi It is certified that error appears in the above-identified patent and that said Letters Patent is hereby corrected as shown below:

Column 23, line 53:
"form" should be changed to --from--

In Claim 8, Column 24, line 47-48:

"$0.8 \leq \alpha1/\alpha2 < 1.25$" should be changed to --$0.8 \leq \alpha1/\alpha2 \leq 1.25$--

"$0.8 \leq \beta1/\beta2 < 1.25$" should be changed to --$0.8 \leq \beta1/\beta2 \leq 1.25$--

Signed and Sealed this

Fourteenth Day of August, 2007

JON W. DUDAS
*Director of the United States Patent and Trademark Office*